United States Patent
Cho et al.

(10) Patent No.: US 7,587,524 B2
(45) Date of Patent: Sep. 8, 2009

(54) CAMERA INTERFACE AND METHOD USING DMA UNIT TO FLIP OR ROTATE A DIGITAL IMAGE

(75) Inventors: Jin-Hyun Cho, Kyungkki-Do (KR); Jung-Sun Kang, Kyungkki-Do (KR); Jin-Aeon Lee, Kyungkki-Do (KR); Young-Ha Park, Kyungkki-Do (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 429 days.

(21) Appl. No.: 11/031,037

(22) Filed: Jan. 7, 2005

(65) Prior Publication Data
US 2005/0152197 A1     Jul. 14, 2005

(30) Foreign Application Priority Data
Jan. 9, 2004    (KR)  ....................... 10-2004-0001618

(51) Int. Cl.
*G06F 13/28*     (2006.01)
*G06K 9/36*     (2006.01)
*G06K 9/32*     (2006.01)
*G06F 7/00*     (2006.01)

(52) U.S. Cl. ......................... 710/22; 382/276; 382/277; 382/297; 707/101

(58) Field of Classification Search ..................... 710/22
See application file for complete search history.

(56) References Cited

U.S. PATENT DOCUMENTS 4,975,977 A * 12/1990 Kurosu et al. ............... 382/277
5,016,876 A * 5/1991 Loffredo ....................... 463/33
5,193,169 A * 3/1993 Ishikawa ...................... 710/22
5,459,823 A * 10/1995 Silverbrook et al. ......... 345/592
5,686,960 A * 11/1997 Sussman et al. .......... 348/218.1

(Continued)

OTHER PUBLICATIONS

Kim, Youngsik; Kim, Young-Wan, Won, Soon-Jae[u.a]; "A System Manager for Network System-on-a-Chip Designs with Various Memory Access Types.", 2001, IEEE Symp. on VLSI Technology, Systems and Applications, S. 176-179, DOI: 10.1109/VTSA.2001. 934513.

*Primary Examiner*—Henry W. H. Tsai
*Assistant Examiner*—Michael Sun
(74) *Attorney, Agent, or Firm*—F. Chau & Associates, LLC

(57) ABSTRACT

A camera interface employing a direct memory access (DMA) unit to digitally perform an image transformation such as "flipping" and "rotating" an image (e.g., to correct for X-axis, Y-axis, or XY-axes mirroring). The image transforming DMA unit includes an address generator and a data selector. The address generator appropriately modifies a frame start address, a burst transfer address, a line start address, of an image frame, based on the X, Y, or XY mirrored image mode. The data selector changes the sequences of words and of pixels in a word based upon the mirrored image mode. The data selector includes a plurality of pixel-sequence modifying multiplexers each for selecting between a word having an original pixel sequence stored in the buffer memory and a word having the reverse pixel sequence; and a word-sequence modifying multiplexer outputting the selected words in the original word sequence or in the reverse word sequence in response to outputs of a counter that increments or decrements based upon the mirrored image mode.

26 Claims, 21 Drawing Sheets

U.S. PATENT DOCUMENTS

| | | | | |
|---|---|---|---|---|
| 5,844,625 | A * | 12/1998 | Sawada | 348/571 |
| 5,862,407 | A * | 1/1999 | Sriti | 710/23 |
| 6,304,927 | B1 * | 10/2001 | Mishra et al. | 710/65 |
| 6,330,374 | B1 * | 12/2001 | Yamaguchi et al. | 382/297 |
| 6,473,123 | B1 * | 10/2002 | Anderson | 348/230.1 |
| 6,597,394 | B1 * | 7/2003 | Duncan et al. | 348/222.1 |
| 7,284,072 | B2 * | 10/2007 | Pai et al. | 710/22 |
| 2003/0081224 | A1 * | 5/2003 | Ouchi | 358/1.2 |
| 2003/0095124 | A1 * | 5/2003 | Tjandrasuwita | 345/538 |
| 2004/0012684 | A1 * | 1/2004 | Tinnerino | 348/208.1 |
| 2005/0057479 | A1 * | 3/2005 | Richards | 345/98 |
| 2006/0114214 | A1 * | 6/2006 | Griffin et al. | 345/98 |

* cited by examiner

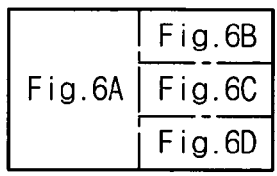
Fig. 6A
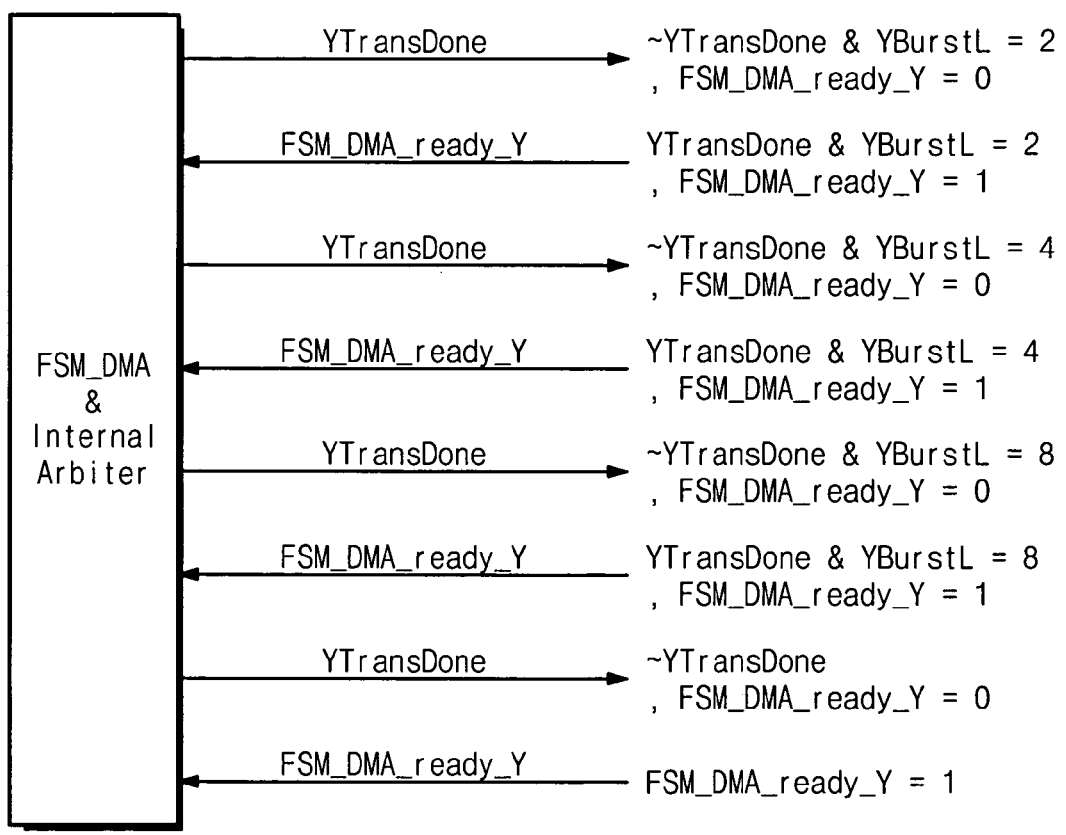

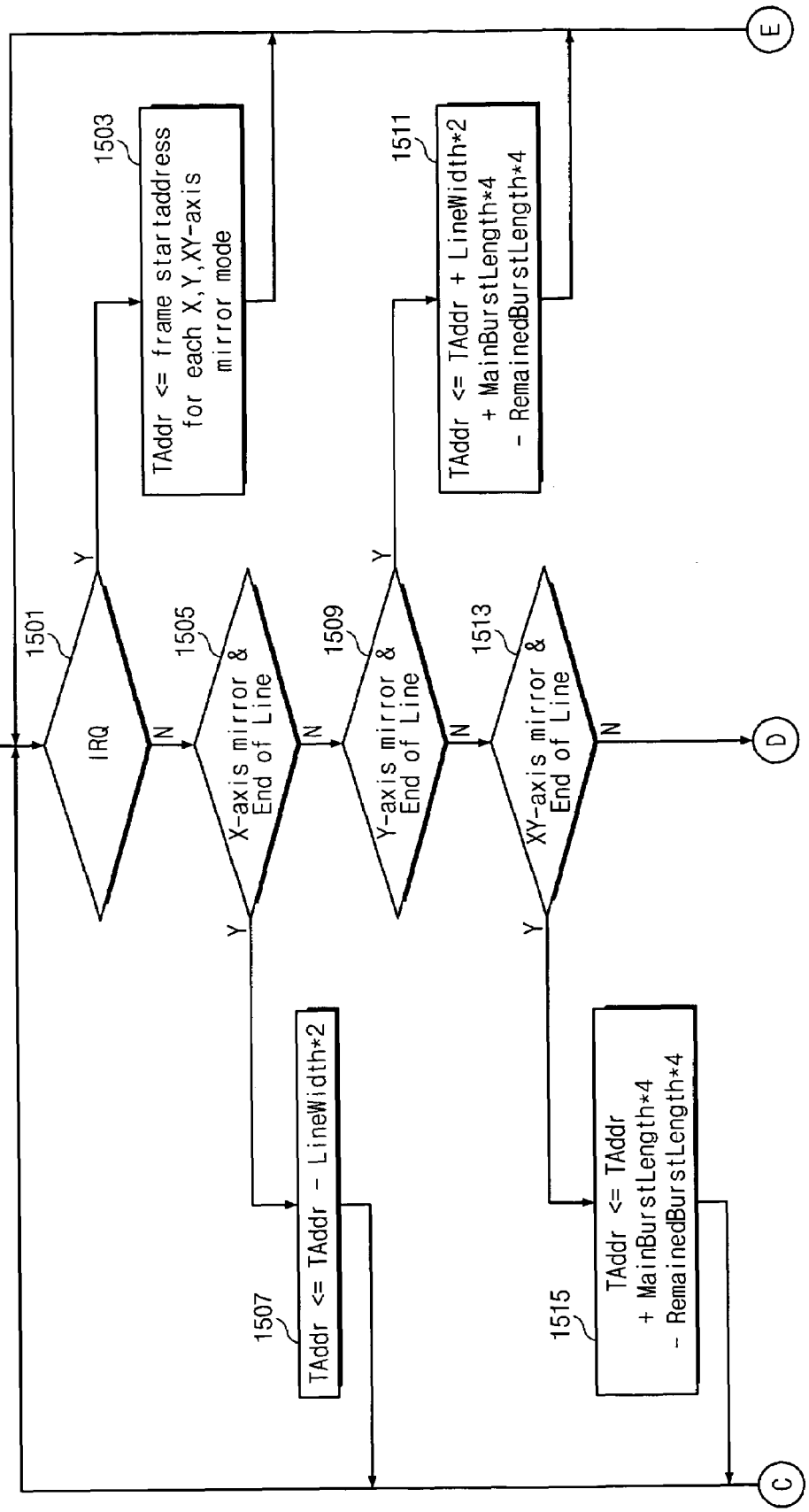

CAMERA INTERFACE AND METHOD USING DMA UNIT TO FLIP OR ROTATE A DIGITAL IMAGE

CROSS-REFERENCE TO RELATED APPLICATIONS

This application claims priority, under 35 U.S.C. § 119, of Korean Patent Application 2004-01618 filed on Jan. 9, 2004, the entire contents of which are hereby incorporated by reference.

FIELD OF THE INVENTION

The present invention relates to digital camera systems, and more particularly to a camera interface for implementing an image transform to correct for X-axis, Y-axis, or XY-axes mirroring, using a direct memory access (DMA) unit.

DISCUSSION OF RELATED ART

Rapid development in the mobile communication industry has enabled consumers to enjoy convenience in sharing information, particularly images, using cellphones and other portable (or mobile) terminals. Since the early days of using the mobile phones only for voice (audio) calls and message transmission, their function has been recently extended even to downloading MP3 music files through of the wireless mobile internet network. Now, in response to consumer demand for imaging and multimedia applications, mobile phones equipped with camera modules have become widely available.

Such "phonecams" (cellphones with a camera module) usually include an image sensor and an image signal processor, by which an real image (light originating from a subject) is converted into an electrical signal by the image sensor and then the electrical signal is output as a displayable digital image by the image signal processor.

The image sensor is composed of pixels arranged in a two-dimension array (matrix). Each pixel is formed of a photodiode (for converting received light into electric charge) and a read-out cell. The read-out cell of the pixel may employ a capacitor (e.g., a CCD for storing and transporting the charge from the photodiode) and/or a transistor. The image sensor may be composed of charge coupled devices (CCD) or of a complementary metal-oxide-semiconductor (CMOS). In a CCD-based image sensor employing capacitors as the read-out cells, charge is shifted (transferred) along a channel path to read out image data therefrom. In a CMOS image sensor, charges or voltages are read out by operations of row and column decoders.

The CMOS image sensors are widely used in mobile phones because of high integration density and low power consumption, compared with the CCD image sensors. CCD image sensors are widely employed in digital still cameras, video cameras, (e.g., closed-circuit televisions, and camcorders) because of fine image quality and high light-sensitivity.

However, with technical improvements in the CCD image sensors reducing power consumption and providing high density, it is predictable that CCD image sensors to be widely used in mobile phones, especially in view of the increasing customer demand for higher resolution cameras.

In employing the CCD image sensor in a mobile phone, an image upset phenomenon may occur. Such an image upset (e.g., a flip or a rotation) is caused by lenses and/or mirrors and positional variation of the camera module of the mobile phone. Depending on the positional variation of the camera module, there can be an X-axis symmetrical image (i.e., X-axis mirrored image), a Y-axis symmetrical image (i.e., Y-axis mirrored image), or an X/Y-axes symmetrical image (i.e., X/Y-axes mirrored image). Therefore, the image upset may require correction by digitally reversing the mirrored image.

The CMOS image sensor can easily be configured to correct for an upset (e.g., flipped or rotated) image by changing the row and column decoders. But, it is difficult to change a CCD image sensor to correct such an upset image because charges (or image signals) therein are detected in the pattern of shift registers directly coupled with the photodiode array and thereby the order of horizontal lines of an output image is fixed. There may be ways to overcome this limitation, e.g., transforming an output image of the CCD image sensor through a frame buffer, by using an image signal processor, or transforming an output image in software after storing it digitally in an external memory. However, a high-capacity frame buffer (e.g., multiple Megapixels) or memory (e.g., multiple megabytes) would be required for correcting the image upset (e.g., flipping or rotation) of a high-resolution image. Using the high-capacity frame buffer in the camera module may cause unnecessary requirements for high-capacity memory and may generate delays in the availability of image data du to the frame buffering processes. Using the external memory in the CCD image sensor may cause frequent unnecessary memory accessing operations, which can hinder he implementation of high-bandwidth, low-power, and small-size mobile phones.

SUMMARY OF THE INVENTION

The present invention is directed to a camera interface, including a DMA unit adapted to perform an image transformation (e.g., flipping, rotation) to correct for X-axis, Y-axis and XY-axes mirroring of images, appropriate for high-bandwidth, low-power, and small-size mobile devices that include cameras.

The present invention provides an image transforming device, particularly using a DMA unit for accomplishing functions of image mirroring (X-axis mirrored image or Y-axis mirrored image) and 180-rotation of an image.

DMA is an acronym for Direct Memory Access. This is a particular method of getting information from memory, usually large blocks of memory by addressing it directly rather than through normal buffers and normal protocol. The DMA calling software (sometimes embedded in hardware) must be intelligent enough where to find a particular block of memory. This is a method usually used by fast disk controllers, tape controllers, SCSI controllers and intelligent database operations. It is often 20 times faster than conventional methods of access.

Direct memory access (DMA) is a means of having a peripheral device control a processor's memory bus directly. In burst mode, the DMA controller keeps control of the bus until all the data buffered by the requesting device has been transferred to memory (or when the output device buffer is full, if writing to a peripheral). In a computing environment, "burst mode" refers generically to any situation in which a device is transmitting data repeatedly without waiting for input from another device or waiting for an internal process to terminate before continuing the transfer of data.

An image transforming (flipping, rotating) circuit according to an embodiment of the present invention includes: a buffer memory for storing image data to be accessed by direct memory access (DMA) with a first burst transfer length; a data selector for selectively modifying sequences of words and of pixels in each word, of the image data stored in the buffer memory; and an address generator for outputting a frame start address, a line start address, a burst transfer start address, for accessing the image data in the buffer memory.

In this embodiment, the data selector includes: a plurality (the number corresponding to the burst transfer length) of pixel-sequence modifying multiplexers selecting between a word stored in the buffer memory and a derived word having a reverse pixel sequence; and a word-sequence modifying multiplexer receiving the selected words from the plurality of pixel-sequence modifying multiplexers and outputting the words in their original (input) sequence or in the reverse sequence. Each of the pixel-sequence modifying multiplexers selects one of the words (having the original or the reverse pixels sequence) in response to a mode selection signal; and the word-sequence modifying multiplexer sequentially outputs the words (in original order or reverse order) in response to outputs of a counter ranging between 0 and L−1 (L is the burst transfer length). According to the active mirror image mode, an initial value of the counter is set to one of 0 and L−1. For example, the initial value of the counter is set to 0 in an X-axis mirror image mode or a normal mode, while it is set to L−1 in an XY-axes mirror image mode or a Y-axis mirror image mode.

In the X-axis mirror image mode, the data selector maintains the original sequences of words and of pixels in a word, of the image data stored in the buffer memory; and the address generator establishes the frame start address by subtracting an address corresponding to a horizontal line, from the whole address space of a frame of the image data; and it establishes a new line start address (after terminating a process for a first horizontal line) by subtracting an address, corresponding to two horizontal lines, from a current address.

In the Y-axis mirror mode, the data selector reverses the sequences of words and of pixels in a word, of the image data stored in the buffer memory; and the address generator establishes the frame start address by adding an address space corresponding to the burst transfer length, to an address space corresponding to one horizontal line of the image data, establishes the burst transfer start address by subtracting an address space corresponding to a sum of the burst transfer length and a current burst transfer length, from a current address before a burst transfer; and (after terminating a process for one horizontal line) it establishes a line start address by adding address spaces, corresponding to two horizontal lines and a difference between the last two transfer burst lengths of a horizontal line, to a current address.

In the XY-axes mirror image mode, the data selector reverses the sequences of words and of pixels in a word, of the image data stored in the buffer memory; and the address generator establishes the frame start address by adding an address space corresponding to the burst transfer length, to the whole address space of a frame of the image data, establishes the burst transfer start address by subtracting an address space corresponding to a sum of the burst transfer length and a current burst transfer length, from a current address before a burst transfer; and (after terminating a process for a horizontal line) establishes the line start address by adding address spaces, corresponding to a difference between the last two burst transfer lengths of a horizontal line, to a current address.

In the X-axis mirror mode and XY-axes mirror image mode, when the number of pixels on a horizontal line is not equal to a multiple of the number of pixels corresponding to the burst transfer length, the last burst transfer start address is established by subtracting an address space corresponding to a sum of main and remaining burst transfer lengths, from a current address.

In this embodiment, when the number of pixels on one horizontal line is not equal to a multiple of the number of pixels corresponding to the burst transfer length, the burst transfer is performed divided into a main burst transfer and a remaining burst transfer that is the last burst transfer of a horizontal line.

Another embodiment of the invention provides a DMA unit for image transform, including: a buffer memory for storing image data to be accessed by DMA having a burst transfer length; a DMA controller for managing a burst DMA access of the buffer memory; a data selector for modifying sequences of words and of pixels in each word, of the image data stored in the buffer memory, based upon a state of the DMA controller.

The DMA unit may further include an address generator for outputting a frame start address, a line start address, a burst transfer start address, for image data supplied from the data selector, based on a condition of the DMA controller; and a bus protocol signal generator for outputting a bus signal with reference to conditions of the DMA controller and a bus.

In this embodiment, the DMA controller may include; a DMA-finite state machine (FSM) indicating a DMA transfer state; a channel arbiter managing DMA access priorities for color components; and a fetch-finite state machine (FSM) controlling a data fetch to an external FIFO memory based on the states of the DMA-finite state machine and the channel arbiter.

An embodiment of the present invention also provides a camera interface for transferring image data to an external frame memory from a camera module through a system bus, the camera interface being adapted to perform image transformations (e.g., flipping, rotating). The camera interface includes: a pre-processor managing a pre-processing operation with the image data received from the camera module; a color scaler for storing image data in a FIFO memory and for modifying the number of pixels of the image data from the pre-processor; and a DMA unit for loading image data stored in the FIFO memory on the system bus, and for performing an image transformation (e.g., flipping or rotating).

The DMA unit may include: a buffer memory for storing the image data provided from the FIFO memory; a DMA controller for managing a DMA burst transfer to the buffer memory; a data selector for modifying sequences of words and of pixels in each word, of the image data stored in the buffer memory, based upon the state of the DMA controller; an address generator outputting a frame start address, a line start address, a burst transfer start address, for image data supplied from the data selector, based on the state of the DMA controller; and a bus protocol signal generator for outputting a bus signal with reference to the states of the DMA controller and of a the bus.

An embodiment of the present invention provides a mobile phone including a camera module having an interface that performs image mirror function (e.g, flipping or rotating) using a direct memory access (DMA) unit.

BRIEF DESCRIPTION OF THE DRAWINGS

Preferred embodiments of the present invention will be described below in more detail with reference to the accompanying drawings. Each of the drawings illustrates an exemplary embodiment or methods of operation of the present invention and, together with the description, serve to explain principles of the present invention. Like numerals refer to like elements throughout the specification and drawings. In the drawings.

DETAILED DESCRIPTION OF PREFERRED EMBODIMENTS

Figure 1:
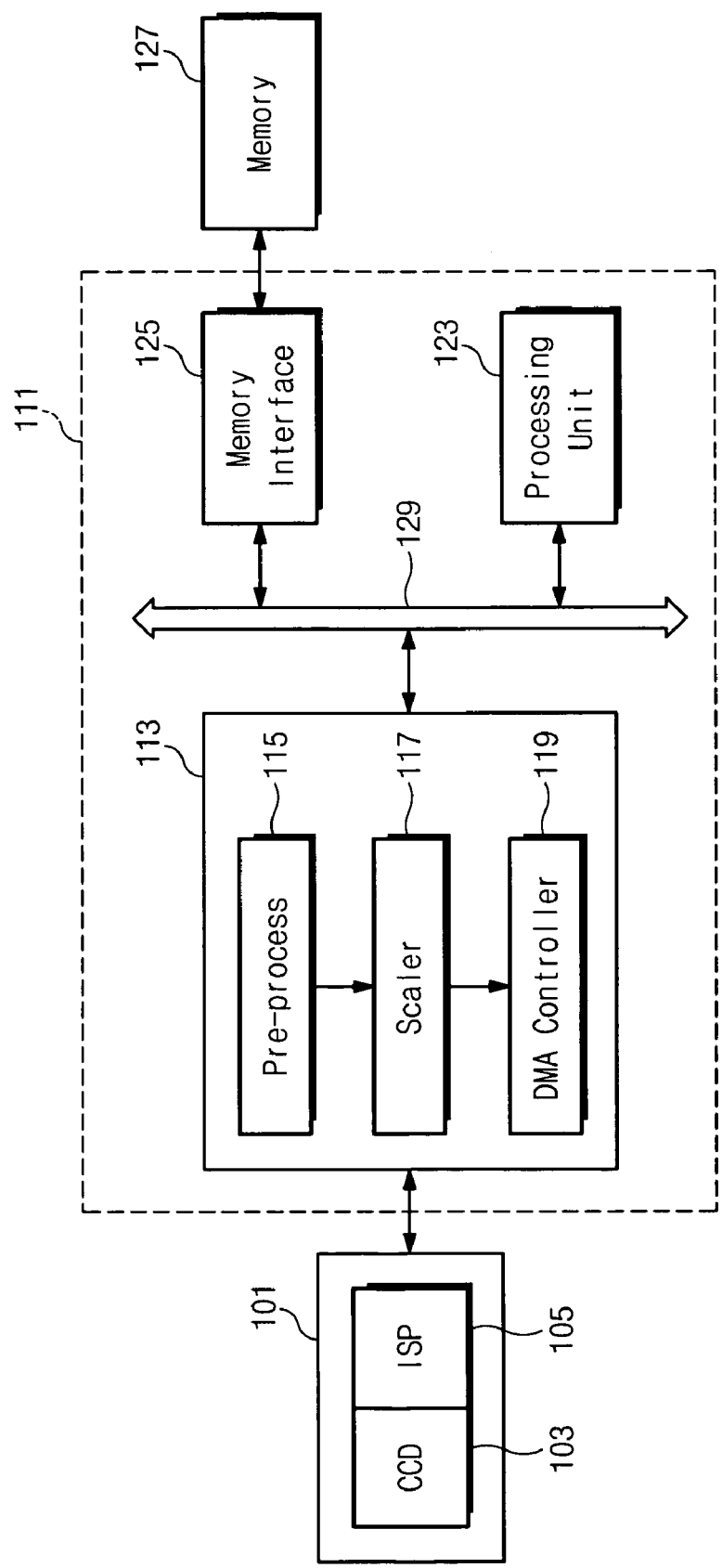
FIG. 1 is a block diagram illustrating a camera module and an application processor in a mobile phone in accordance with an embodiment of the present invention.

FIG. 1 is a block diagram illustrating a camera module 101 and an application processor 111 in a mobile phone in accordance with an embodiment of the present invention. Referring to FIG. 1, the camera module 101 comprise an image sensor 103 and an image signal processor (ISP) 105. The image sensor 103 may be comprised of a CCD image sensor or a CMOS image sensor. The application processor 111 includes a camera interface 113, a processing unit 123, a memory interface 125, and a system bus 129 for operatively interconnecting them. The system bus 129 is for example an advanced high performance (AHB) bus, being connected to an external frame memory 127 that is a synchronous DRAM as an example. The camera interface 113 comprise a pre-processor 115, a color scaler 117, and a DMA (controller) unit 119 for performing the image transforming functions.

After converting an optical (real) image by receiving light originating from a subject into an electrical signal by the image sensor 103, the electrical signal is transferred to the image signal processor 105 and then transferred as pixel data to the camera interface 113. The camera interface 113 continuously collects pixel data, which is received from the camera module 101, the pixel data being expressed in color components. The pixel data is transformed and then transferred to the system bus 129. The pixel data loaded on the system bus 129 is stored in the frame memory 127 through the memory interface 125. An image frame stored in the frame memory 127 may be transferred after being compressed, or displayed on an LCD screen of the mobile phone.

The pre-processor 115 of the camera interface 113 converts Y/Cb/Cr pixel data of 4:2:2 format into Y/Cb/Cr pixel data of 4:2:0 format, and operates a windowing function and various pre-processes. The pre-processor 115 also separates the Y/Cb/Cr data into components of luminance (Y) and chrominance (Cb, Cr). In Y/CB/CR defined formats, Y is the luminance and Cb and Cr are the color difference signals. Crudely defining these, Y describes the luminance or monochrome element of the video, and Cb and Cr are B-Y and R-Y respectively, which are the primary colors Blue and Red minus the luminance (Y) element. The separated luminance and chrominance data are transferred to the color scaler 117.

The color scaler 117 includes scaling units for codec and preview routes. The preview color scaler enables a user to watch an image captured by the camera module 101, on an LCD screen of the mobile phone. The codec scaling units is provided to compress and transfer an image. Each scaling units stores image data into a FIFO memory with an increasing or decreasing the number of pixels supplied from the pre-processor. The preview scaling unit includes a color converter to change Y/Cb/Cr data into R/G/B data.

The DMA unit 119 properly modifies image data accepted from the color scaler 117 in compliance with a mirrored image mode and provides the modified image data to the system bus. The DMA unit 119 is transferred to both the codec and preview scaling units. The DMA unit 119 is a specific DMA unit adapted for a predetermined image mirror function (i.e., image restoring function).

Figure 2:
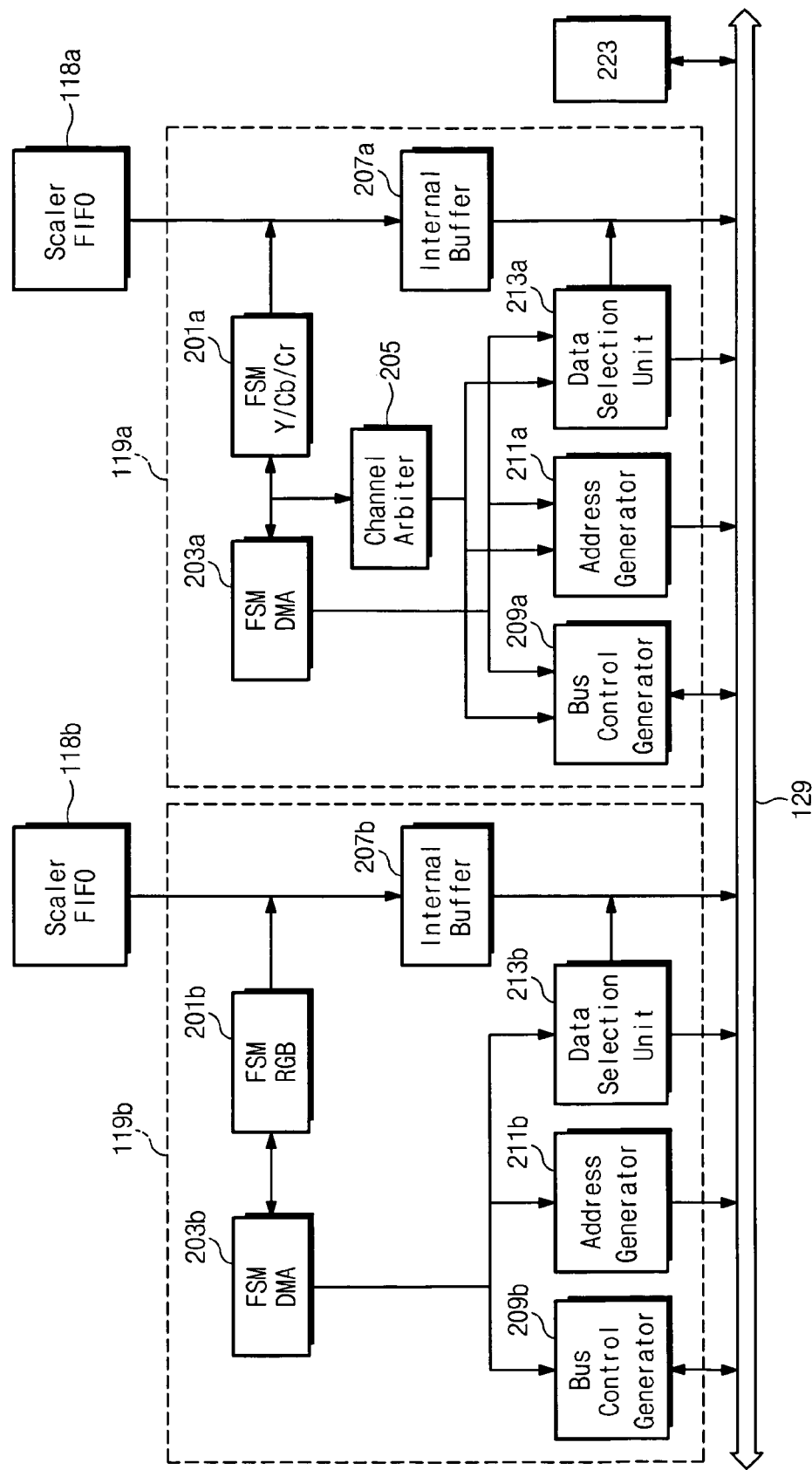
FIG. 2 is a circuit block diagram of a DMA controller shown in FIG. 1.

FIG. 2 is a block diagram of the DMA 119 shown in FIG. 1. Referring to FIG. 2, the DMA unit 119 is divided into a codec DMA unit 119a and a preview DMA unit 119b. Each DMA unit, e.g., 119a (or 119b), comprise: an internal buffer memory 207a (or 207b) for storing image data; a FIFO memory 118a (or 118b) of the codec color scaler (or the preview color scaler); an address generator 211a (or 211b) for changing a system bus address in compliance with a mirrored image mode; and a data selector 213a (or 213b) for changing an order of image data output from the internal buffer memory 207a (or 207b) in accordance with a mirrored image mode. The DMA unit 119a (or 119b) also includes a protocol signal generator 209a (or 209b) for creating a system protocol signal. The address generator 211a (or 211b) offers a frame start address, a line start address, and burst transfer start address, for storing image data into the (external) frame memory 127 from the internal buffer memory 207a (or 207b). The data selector 213a (or 213b) selects output image data from the internal buffer memory 207a (or 207b) with modified sequences of words and pixels in a word.

An image frame stored in the FIFO memory 118a (or 118b) is further stored in the internal buffer memory 207a (or 207b) in order to be accessed from the system bus 129 in a burst format. The image data stored in the internal buffer memory 207a (or 207b) is transformed in the sequences of words and of pixels in accordance with a mirrored image mode and then stored in the external frame memory 127 through the system bus 129 in a burst format. During this, an address for storing the image data in the external frame memory 127 is provided by the address generator 211a (or 211b). The address selector 211a (or 211b) provides a frame start address, a line start address, and burst transfer start address, of the image data accessed with burst in compliance with an image mirror mode.

A burst transfer length L is a multiple of 2, e.g., 2, 4, 8, or 16. If there is a remainder after dividing the number of horizontal pixels of an image frame to be processed by the number of pixels corresponding to a burst length (i.e., the remainder of pixels is smaller than the number of pixels corresponding to the burst length), the remaining pixels are processed by a remaining burst transfer mode, suitable for the remaining pixel number, in order to enhance bus efficiency. In other words, the burst transfer operation is composed of a main burst transfer mode and the remaining burst transfer mode. Processing the image data in the main burst transfer mode with a predetermined burst length L (e.g., 2, 4, 8, or 16), the last remaining data (smaller than the predetermined burst length) is processed in the remaining burst transfer mode. Since the number of horizontal pixels to be processed is known, information about the main and remaining burst transfer lengths is established by a specific functional register.

The last two burst transfer operations, for pixels on a horizontal line of one image frame, might be all transferred in the main burst transfer mode (when the horizontal pixel number is clearly divided by a predetermined burst length without a remainder), or the main burst transfer mode plus the remaining burst transfer mode. The burst transfer length may be predetermined with consideration for the size of a horizontal line in an image frame and the characteristics of a system bus therein.

For example, assuming that the number of horizontal pixels is 240 (60 words), after performing seven times a burst transfer with in the burst length 8, the number of remaining pixels is sixteen, i.e., four words. Therefore, after completing the main burst transfer mode with the burst length 8, the last remaining pixels of four is processed by the remaining burst transfer mode.

As another example, assuming that the number of horizontal pixels is 224 (56 words), all the horizontal pixels can be processed in the main burst transfer mode by performing the burst transfer of length 8 seven times. Alternatively, the 224 horizontal pixels can be processed through the main burst transfer mode of three times with the burst length 16 and next through the remaining burst transfer mode with the burst length 8.

In an X-axis mirror image mode or a normal image mode, the data selector (data selection unit 213a (or 213b)) loads image data of the internal buffer memory 207a (or 207b) on the system bus, without modifying the sequences of words and of pixels in a word. In a Y-axis mirror image mode or an XY-axis mirror image mode, the data selector) data selection unit 213a (or 213b)) loads image data of the internal buffer memory 207a (or 207b) on the system bus, with a reversal of the sequences of words and of pixels in a word.

In the X-axis mirror image mode, the address generator 211a (or 211b) establishes a frame start address (for transferring the first horizontal line to be transferred) by subtracting an address space of one horizontal line from the whole address space of one frame, and then after terminating the process for transferring the first horizontal line, establishes a new line start address (for transferring the second horizontal line to be transferred) by subtracting an address space of two horizontal lines from a current address (of the frame).

In the Y-axis mirror image mode, the address generator 211a (or 211b) establishes a frame start address (for transferring the first horizontal line to be transferred) by adding an address space, which is assigned to the burst transfer, to an address space corresponding to one horizontal line. The address generator 211a (or 211b) establishes a burst transfer start address by subtracting an address space, corresponding to two times the main burst transfer mode, from a current address, preliminarily allowing for an address to be increased from the current address due to the burst transfer before the current burst transfer. The address generator 211a (or 211b) also establishes a line start address by adding an address space, corresponding to two horizontal lines, and an address space, (corresponding to a difference between the last two burst transfers), to a current address at the time of terminating a process for one horizontal line.

On the other hand, in the XY-axis mirror image mode, the address generator 211a (or 211b) establishes: a frame start address by adding an address, (corresponding to a burst transfer), to the whole address space of one frame; a burst transfer start address by subtracting an address space, (corresponding to two times of the main burst transfer), from a current address, preliminarily allowing for an address to be increased from the current address due to the burst transfer before the burst transfer; and a line start address by adding an address space, (corresponding to a difference between the last two burst transfers of one horizontal line), to a current address at the time of terminating a process for one horizontal line.

In the X-axis and XY-axis mirror image modes, unless the number of pixels is divisible by the number of pixels corresponding to the main burst transfer length, the last burst transfer start address is obtained by subtracting an address space, corresponding to a sum of the main and remaining burst transfers, from a current address.

The address generator 211a (or 211b) and the data selector 213a (or 213b) will be more described further in conjunction with the accompanying drawings.

A data fetch to an internal buffer memory 207a (or 207b) from the FIFO memory 118a (or 118b) of the color scaler is controlled by a fetch-FSM (finite state machine) 201a (or 201b); and a DMA transfer status is informed by DMA-FSM (finite state machine) 203a (or 203b). The codec DMA unit 119a has internal buffer memories corresponding to the components Y, Cb, and Cr, and further includes a channel arbiter 205 (not present in the preview DMA unit 119b), for managing DMA access operations for luminance data Y and the chrominance data Cb/Cr. The preview DMA unit 119b does not need an arbiter for separating the color components in channels because its input data is configured in an RGB format.

The channel arbiter 205 of the codec DMA unit 119a, as a logic circuit for controlling bus occupancy by the luminance and chrominance components Y, Cb, and Cr, manages channel selection (or data selection) and authorization for loading the color data on the bus 129 from the internal buffer memory 207a, per channels (or colors). As luminance data has more transfer volume in general, the luminance data is processed with higher priority while the chrominance data (Cb, and Cr) is processed with the same priority and selected by a ping-pong transmission type.

The fetch-FSM (finite state machine) 201a (or 201b) controls a fetch operation from the FIFO memory 118a (or 118b) with reference to the DMA-FSM (finite state machine) 203a (or 203b) (and the channel arbiter 205 in the case of 119a). The fetch-FSM (finite state machine) 203 outputs a read-out control signal only when the FIFO memory 208a (or 208b) is not empty and the internal buffer memory 207a (or 207b) completes a DMA transfer operation, and stores data in the internal buffer memory 207a (or 207b) from the FIFO memory 208a (or 208b) just by the amount of burst transfer length loaded on the system bus. The burst transfer length and the mirror image mode are determined by preset values in specific functional register 223.

Figure 3:
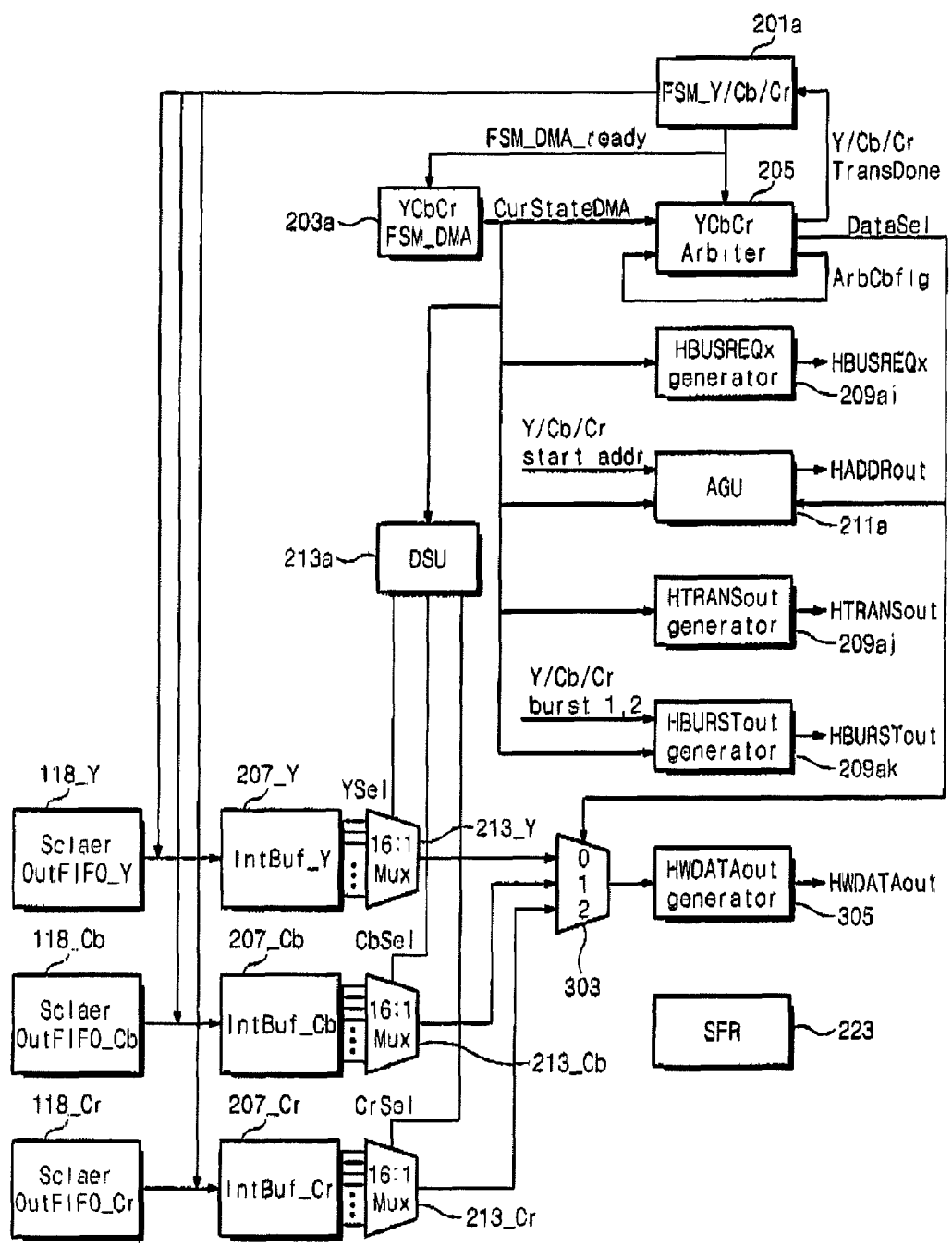
FIG. 3 is a circuit block diagram illustrating the features of data flow and control with a codec DMA unit.

FIG. 3 is a circuit block diagram illustrating the features of data flow and control within the codec DMA unit 119a in accordance with an embodiment of the present invention. The DMA-FSM (finite state machine) 203a informs the channel arbiter 205, the address generator unit (AGU) 211a, the data selection unit (DSU) 213a, and bus protocol signal generators 209ai, 209aj, and 209ak, of a DMA transfer state (CurStateDMA).

The internal buffer memories 207_Y, 207_Cb, and 207_Cr store data, to be accessed in burst mode, from respective FIFO buffer memories 118_Y, 118_Cb, and 118_Cr assigned to each of the components Y, Cb and Cr. During this, the fetch-FSM (finite state machine) 201a controls a data fetch operation from the FIFO memories 118_Y, 118_Cb, and 118_Cr with reference to of the states of the DMA-FSM (finite state machine) 203a and the channel arbiter 205. In other words, the fetch-FSM (finite state machine) 201a receives a signal informing that the internal buffer memories 207_Y, 207_Cb, and 207_Cr are in a state of completion of the DMA transfer, from the channel arbiter 205, and then enables the read-out control signal unless the FIFO memories 118_Y, 118_Cb, and 118_Cr are empty. The read-out control signal enables data to be stored in the internal buffer memories 207_Y, 207_Cb, and 207_Cr from the FIFO memories 118_Y, 118_Cb, and 118_Cr by just the amount of the burst transfer length. And then, the fetch-FSM (finite state machine) 201a generates a DMA-ready signal FSM_DMA_ready to inform the DMA-FSM (finite state machine) 203a and the channel arbiter 205 of the completion of a fetch operation for pixel data.

The channel arbiter 205 communicates with the DMA-FSM (finite state machine) 203a and the fetch-FSM (finite state machine) 201a. The channel arbiter 205 provides a control signal DataSel to a multiplexer 303 corresponding to the burst transfer length and the state (CurStateDMA) of the DMA-FSM (finite state machine) 203a, which controls operations of selecting a channel (or data) among luminance and chrominance components and of loading data on the system bus 129 from the internal buffer memories 207_Y, 207_Cb, and 207_Cr. After completing the data transfer to the system bus 129, the channel arbiter 205 sends a DMA-transfer-end signal Y/Cb/CrTransDone to the fetch-FSM (finite state machine) 201a.

The data selection unit (DSU) 213a generates signals YSel, CbSel, and CrSel for controlling multiplexers 213_Y, 213_Cb, and 213_Cr each assigned respectively to the components Y, Cb and Cr, corresponding to a state of the DMA-FSM (finite state machine) 203a. The control signals YSel, CbSel, and CrSel enable the multiplexers 213_Y, 213_Cb, and 213_Cr to modify the sequences of words and of pixels of data stored in the internal buffer memories 207_Y, 207_Cb, and 207_Cr and to output them to a multiplexer 303. Data output from the multiplexer 303 is loaded on a data bus under the control of a data write-in signal HWDATAout of a data write-in signal generator 305.

The address generator unit (AGU) 211a outputs a system bus address HADDRout for writing the output data of the multiplexer 303 into the external frame memory 127 through the data bus, corresponding with a selected mirror image mode and to a state of the DMA-FSM (finite state machine) 203.

The bus protocol signal generators 209ai, 209aj, and 209ak respectively output: a bus request signal HBUSREQx; a data transfer pattern signal HTRANSout; and a burst transfer signal HBURDTout; respectively, based upon the state of the DMA-FSM (finite state machine) 203a.

Figure 4:
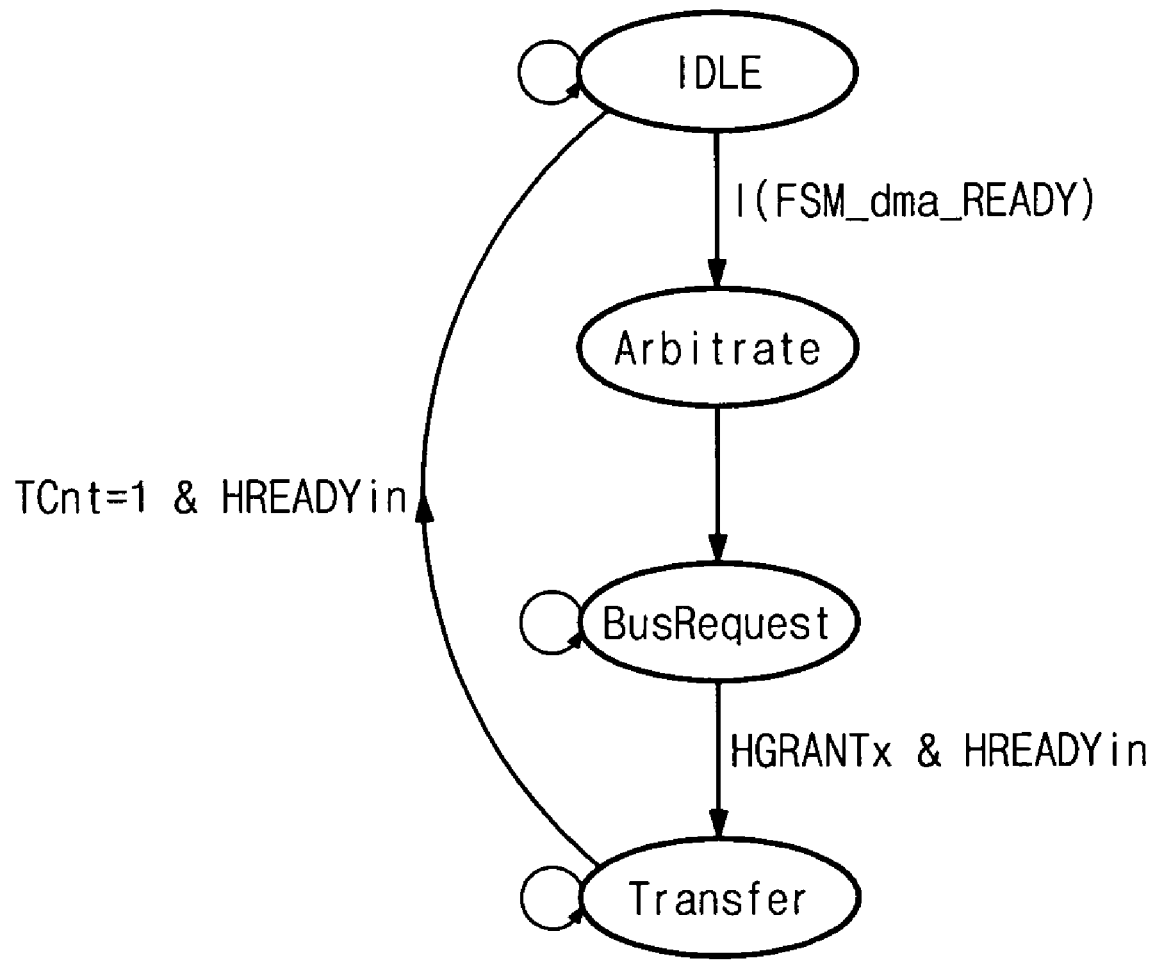
FIG. 4 is a state transition diagram of a DMA-finite state machine.

FIG. 4 is a state transition diagram of the DMA-FSM (finite state machine) 203a (or 203b) of FIG. 2. Referring to FIG. 4, when the DMA transfer-ready signal FSM_DMA_ready is generated from the fetch-FSM (finite state machine) 201a during an idle state IDLE, it transitions to a DMA bus-request state (BusRequest) by way of a DMA arbitration state (Arbitrate). If a bus priority signal HGRANTx and a data transfer end signal HREADYin are enabled while in the bus-request state (BusRequest), it transitions to a DMA transfer-state (TRANSFER). If while in the DMA transfer-state a data transfer is completed and the last data of a burst length is transferred, it returns to the idle state IDLE again.

Figure 5:
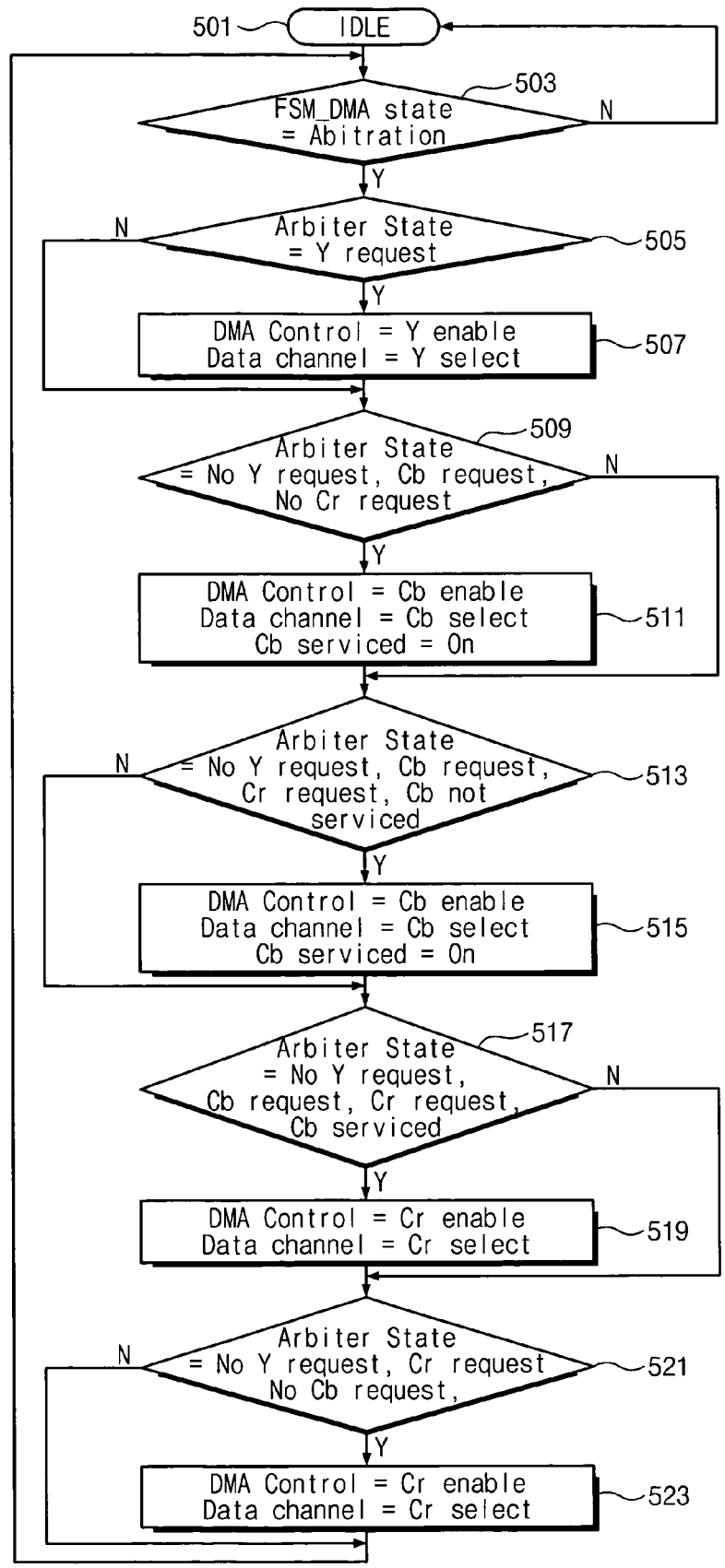
FIG. 5 is a flow chart of a channel arbiter.

FIG. 5 is a flow chart illustrating the method of operation of the channel arbiter 205. The luminance data Y is prioritized higher than the chrominance data Cb/Cr. The chrominance data are accessed with the same priority relative to each other, being selected by a ping-pong transmission sequence. In the decision step S503, unless the DMA-finite state machine (FSM_DMA 203a) is in the arbitration-state (Arbitration), it returns to the idle state. From the idle state IDLE (501), if decision step S503 determines that the DMA-finite state machine (FSM_DMA 203a) is in the DMA arbitration-state "Arbitration" (i.e., Arbitrate of FIG. 4), decision step S505 is next performed to confirm whether there is a transfer request for the luminance data Y. If there is no transfer request for the luminance data Y in the step S505, the step S507 is next performed. If there is a transfer request determined in decision step S505, step S509 is performed wherein the FIFO and internal buffer memories corresponding to the luminance data Y are assigned to transfer the luminance data Y and then decision step S509 is performed. In decision step S509, it is determined whether there is: no request for the luminance data Y; a request for the chrominance data Cb; and no request for the chrominance data Cr (Arbiter State=no Y request; Cb request; and No Cr request). If the decision step S509 results in a positive determination, step S511 is performed wherein a transfer operation for the chrominance data Cb is performed with the FIFO and internal buffer memories corresponding to the chrominance component Cb and then it goes to decision step S513. If decision step S509 results in a negative determination N, decision step S513 is performed. In decision step S513, it is determined whether there is: no request for the luminance data Y; a request for the chrominance data Cb; a request for the chrominance data Cr; and no transfer for the chrominance data Cb (Arbiter State=no Y request; Cb request; Cr request; and Cb not serviced). If the decision step S513 results in a positive determination, step S515 is performed wherein a transfer operation for the chrominance data Cb is performed and then decision step S517 is performed. If the decision step S513 results in a negative determination N, decision step S517 is immediately performed. In the decision step S517, it is determined whether there is: no request for the luminance data Y; a request for the chrominance data Cb; a request for the chrominance data Cr; and a transfer for the chrominance data Cr (Arbiter State=no Y request; Cb request; Cr request; and Cb serviced). If the decision step S517 results in a positive determination, step S519 is performed wherein a transfer operation for the chrominance data Cr is performed and then decision step S521 is performed. If the decision step S517 results in a negative determination N, then decision step S521 is immediately performed. In the decision step S521, it is determined whether there is: no request for the luminance data Y; no request for the chrominance data Cb; and a request for the chrominance data Cr (Arbiter State=No Y request; No Cb request; and Cr request). If the decision step S521 results in a positive determination, step S523 is performed wherein a transfer operation for the chrominance data Cr is performed, and then it returns to the idle state IDLE. If the decision step S521 results in a negative determination N, it directly returns to the idle state IDLE.

Figure 6B:
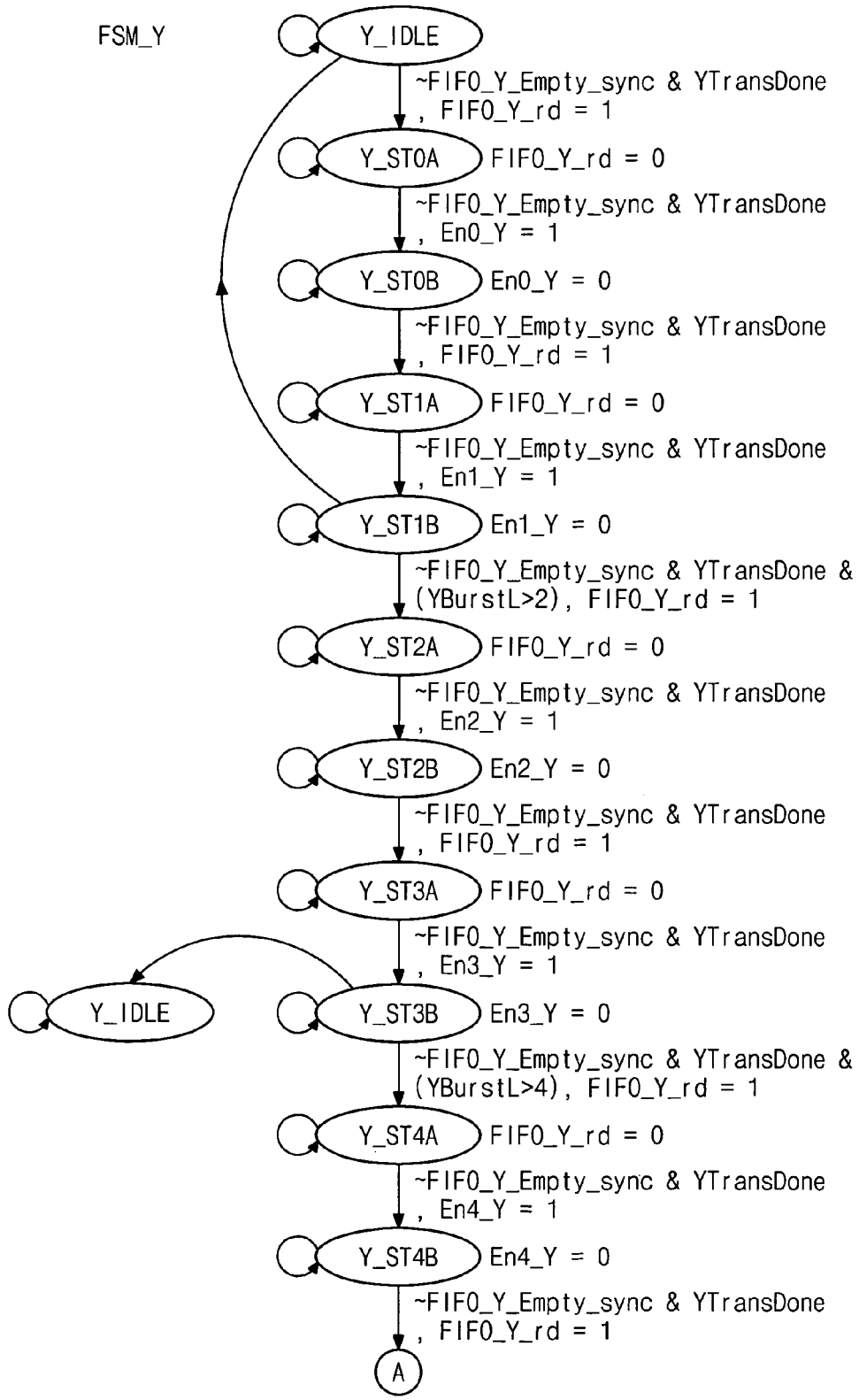
FIG. 6 is a state transition diagram of a fetch-finite state machine for luminance components.
Figure 6C:
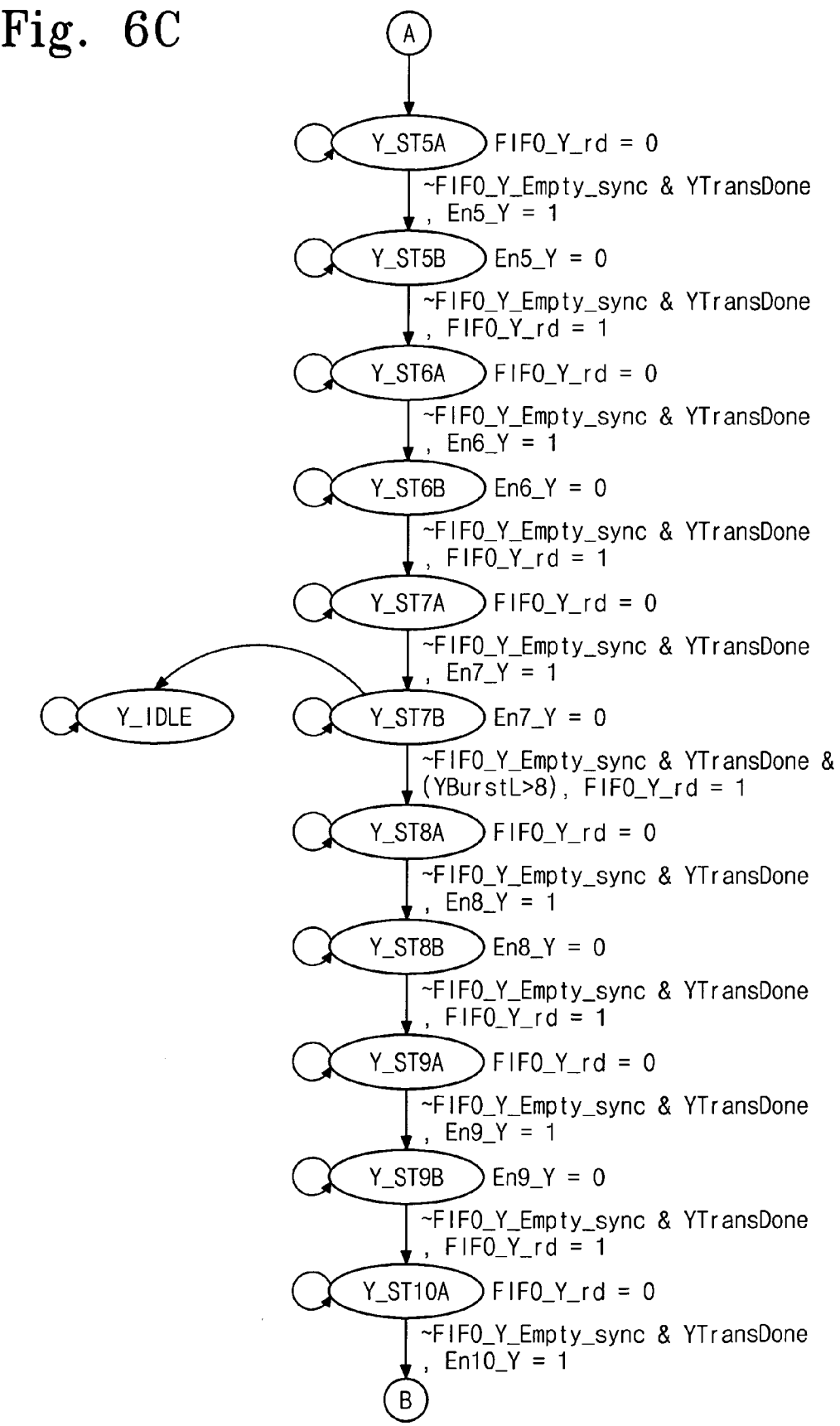
Figure 6D:
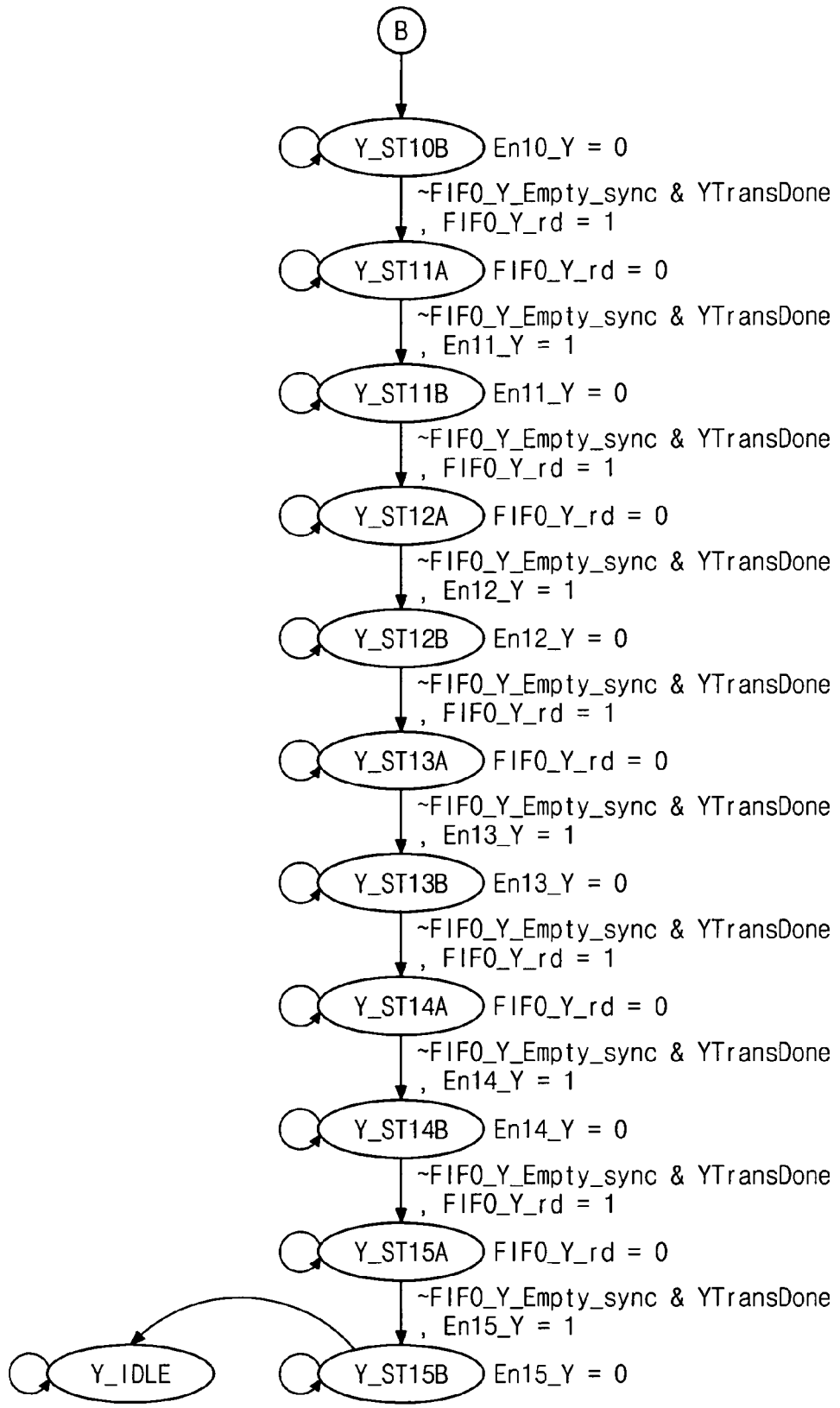

FIG. 6 (6A+6B+6C+6D) is a state transition diagram of the fetch-FSM (finite state machine FSM_DMA 201*a*) for the luminance component Y, which is the same for the chrominance components Cb and Cr. Referring to FIG. 6, it can be seen that the fetch-finite state machine 201*a* controls activation of a fetch operation with data from the FIFO memory to the internal buffer memory 207*a* in conformity to a burst transfer length with reference to the states of the FSM-DMA 203*a* and the channel arbiter 205.

The fetch-finite state machine FSM_DMA 201*a* outputs a read-out control signal FIFO_Y_rd when the FIFO memory is not empty (~FIFO_Y_empty_sync) and the internal buffer memory is in the state of DMA transfer completion (YTransDone), and fetches data for the internal buffer memory from the FIFO memory by the amount of a burst transfer length (YBurst) to be loaded on the system bus 129.

The address generator 209*a* (or 209*b*) and the data selector 213*a* (or 213*b*) will now be described in more detail.

It is assumed herein below that each image data pixel is 1 byte in size and that the system bus can carry 32-bit data. In such a 32-bit bus system, 4 pixels per word are transferred to the external frame memory 123 through the system bus 129. Alternative embodiments of the present invention may also be adapted to other system configurations such as where each pixel is composed of 10 bits or more (not in the 8-bit unit of one byte), in a 16-bit bus system, or a 64-bit bus system. Further assumed here is that the main burst transfer length L is 16 and that the remaining burst transfer length is 8. During the main burst transfer mode, it transfers image data of 16 words (=64 pixels) in each burst.

Figure 7:
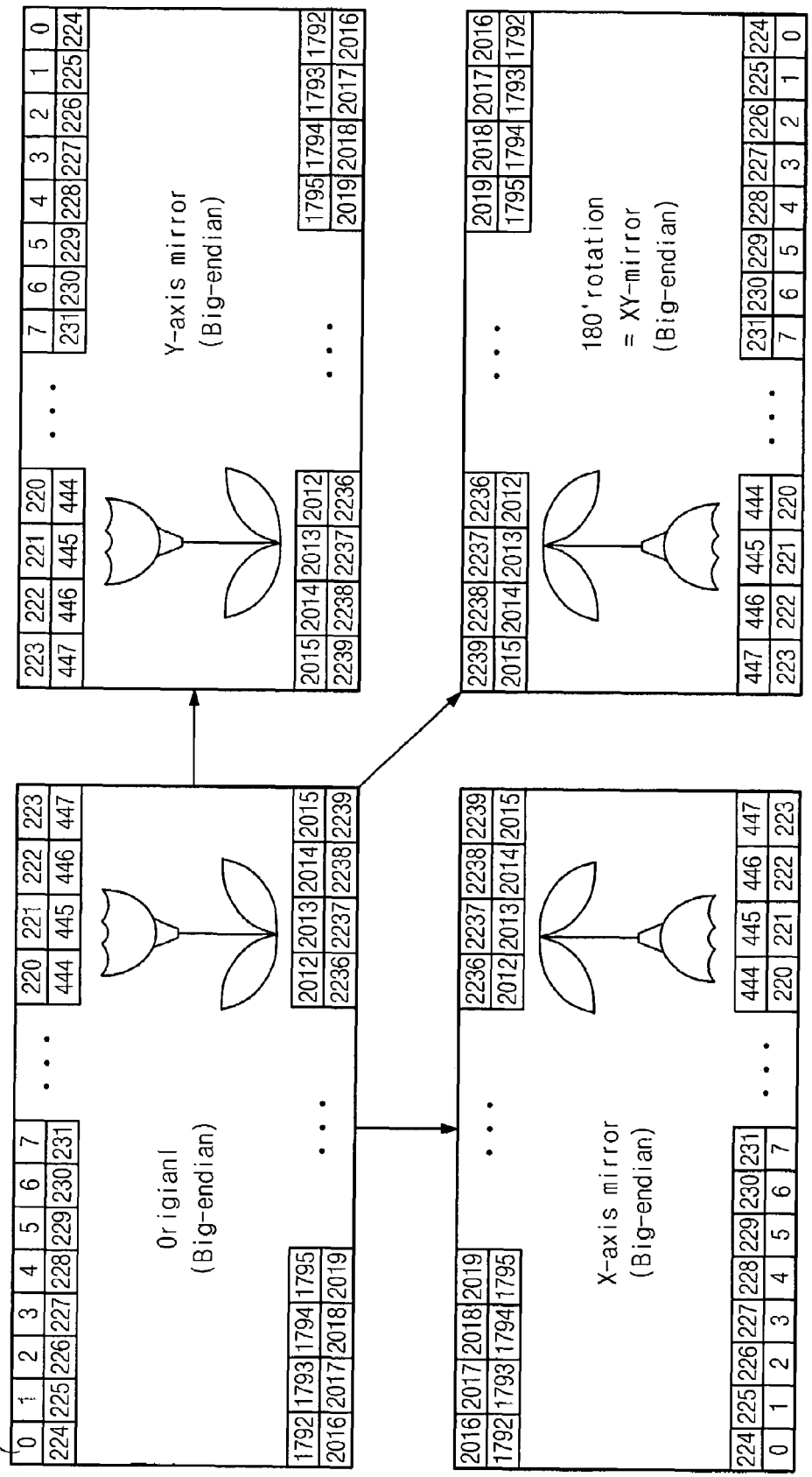
FIG. 7 illustrates and compares an original pixel positions of an image captured by the camera module and pixel positions in various mirror image modes.

FIG. 7 illustrates various mirror image modes by comparing an original pixel position of an image captured by the camera module with pixel positions. In FIG. 7, it is assumed that a horizontal width of an image is 224 pixels and the number of horizontal lines is 10. There are two ways of burst transfer as aforementioned: one is to transfer all data in the main transfer mode with the burst length 8; and the other is to transfer data in the main burst transfer node with the burst length 16 and next in the remaining burst transfer mode with the burst length 8. The following exemplary embodiment employs the later case.

Figure 8:
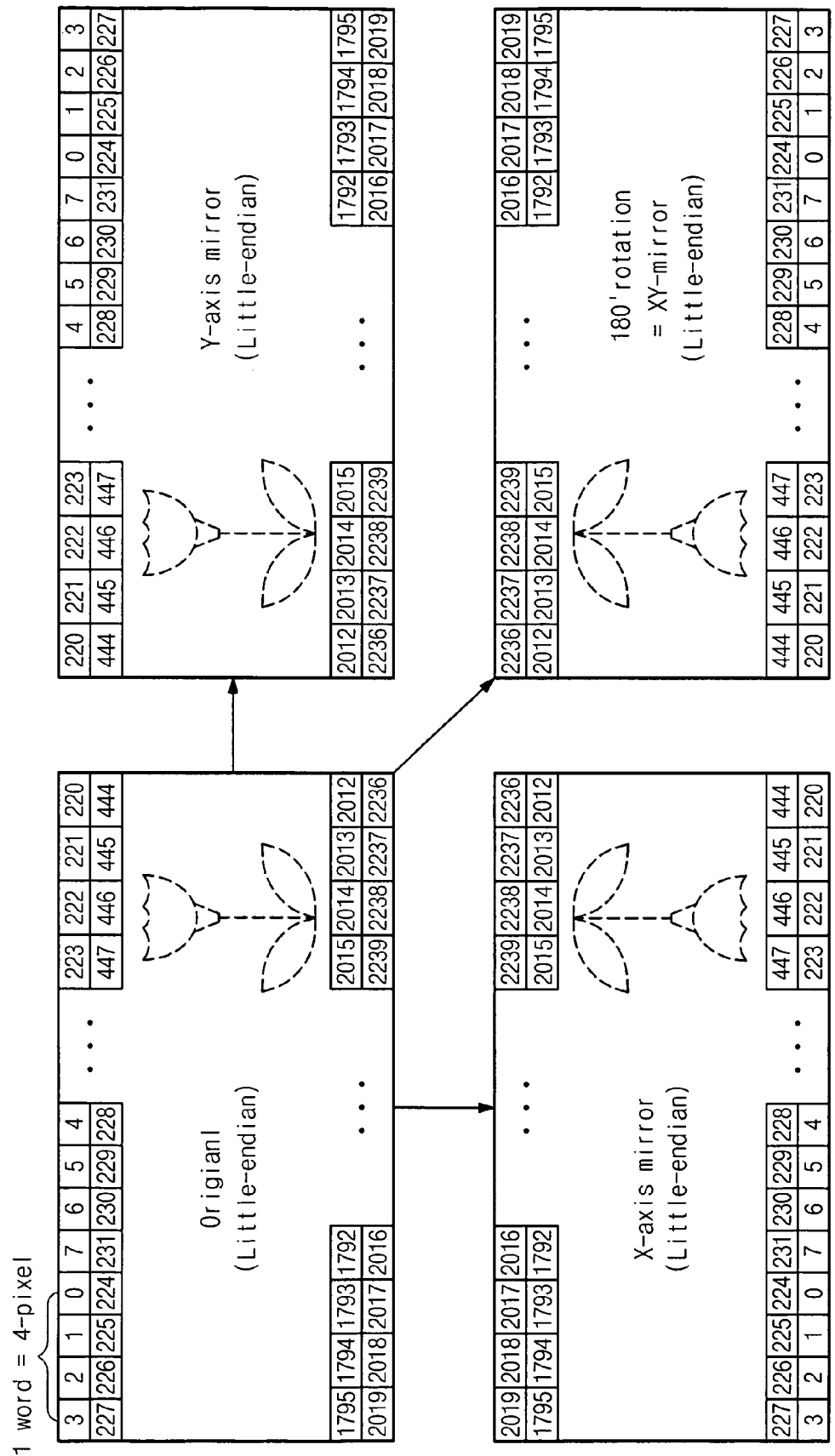
FIG. 8 illustrates pixel positions in the mirrored image modes in a little-endian memory system.

Memory storage conditions shown in FIG. 7 (Big-endian) are the same with those of FIG. 8 (little-endian). Referring to FIG. 8, in the X-axis mirror image mode, the sequences of words and pixels in a word are maintained without change. But in the Y-axis and XY-axes mirror modes, the sequences of words and pixels in a word are modified.

In the X-axis mirror image mode, pixel data are written in one image frame from the last (bottom) horizontal line up line by line towards the upper horizontal line of the frame. In the Y-axis mirror image mode, pixel data are written in one image frame from the last position to the first position of the upper horizontal line of the frame, and then downwards line by line to the bottom of the frame. In the XY-axes mirror image mode, pixel data are written in an image frame upward line by line from the last (bottom) line (as in the X-axis mirror image mode) and from the last position to the first position t in each horizontal line (as in the Y-axis mirror image mode).

X-Axis Mirroring Process for X-Axis Mirror Image Mode

Figure 9:
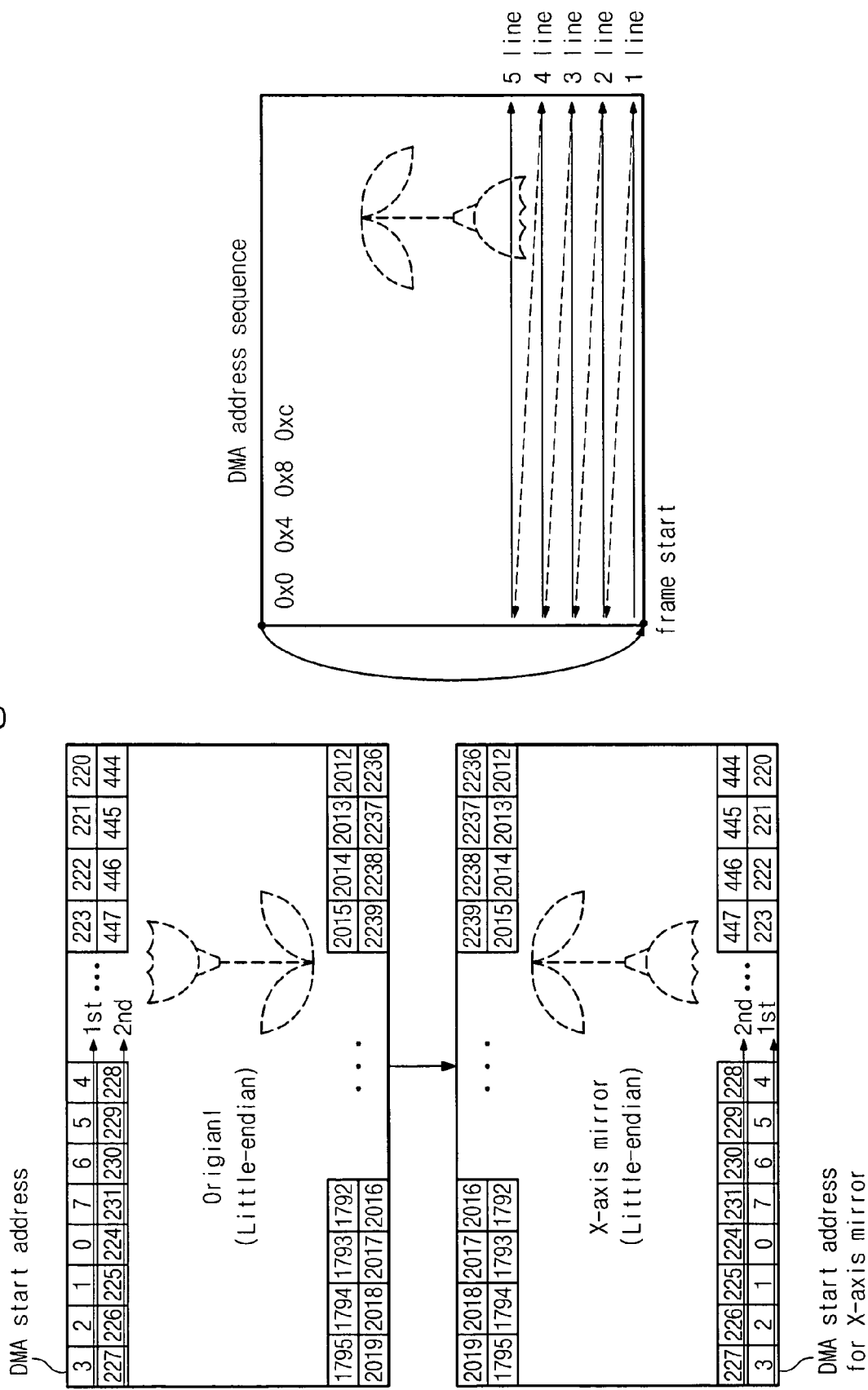
FIG. 9 illustrates an address modification during an image transform (X-axis mirroring, flipping) to correct for an X-axis mirrored image.

FIG. 9 illustrates an address variation during an image transform (mirroring on X-axis) to correct for an X-axis mirrored image. As shown in FIG. 9, an X-axis mirroring procedure maintains the sequences of words and pixels in a word the same as those of the original image but changes a frame start address and a line start address. In other words, the address generator provides addresses for designating a series of horizontal lines that move up the frame from the bottom of the frame by one line whenever a process for one horizontal line is terminated (i.e., whenever a signal EOL is generated to indicate the End Of one horizontal Line). Therefore, in the X-axis mirror image mode, the address generator first establishes a frame start address by subtracting an address space corresponding to one horizontal line from the whole address space of one image frame. Regarding an address after one horizontal line has been already processed, before beginning a transfer for a new horizontal line, a new line start address is established by subtracting addresses corresponding to two horizontal lines from a current (frame) address after terminating a process for one horizontal line.

As illustrated in FIG. 9, the whole address space is sized by multiplying the dimensions of the frame (e.g., 224×20=2240). The line start address is set (e.g., to 2016) by subtracting an address space (e.g., 224) corresponding to one horizontal line (i.e., corresponding to 224 pixels of one horizontal line) from the whole address space of the frame (e.g., 2240). Accordingly, 224 pixel data corresponding to the first horizontal line are stored in the external frame memory 127 from the address 2016 to the address 2239 in sequence. Then, a new line start address 1792 is established by subtracting the address space corresponding to two horizontal lines (i.e., address space 224×2 corresponding to 224×2 pixels) from a current address space of the frame 2240 after terminating the data transfer for one horizontal line. Next, 224 pixel data of the second horizontal line are stored in the external frame memory 127 from the address 1792 to the address 2015 in sequence. Such transfer operations are repeated line by line until completing the data transfer process for one entire frame.

The line start address may be established in an alternative embodiment of the invention by subtracting an address space corresponding to one horizontal line from the previous line start address after completing a data transfer process for one horizontal line.

Y-Axis Mirroring Process for Y-Axis Mirror Image Mode

Figure 10:
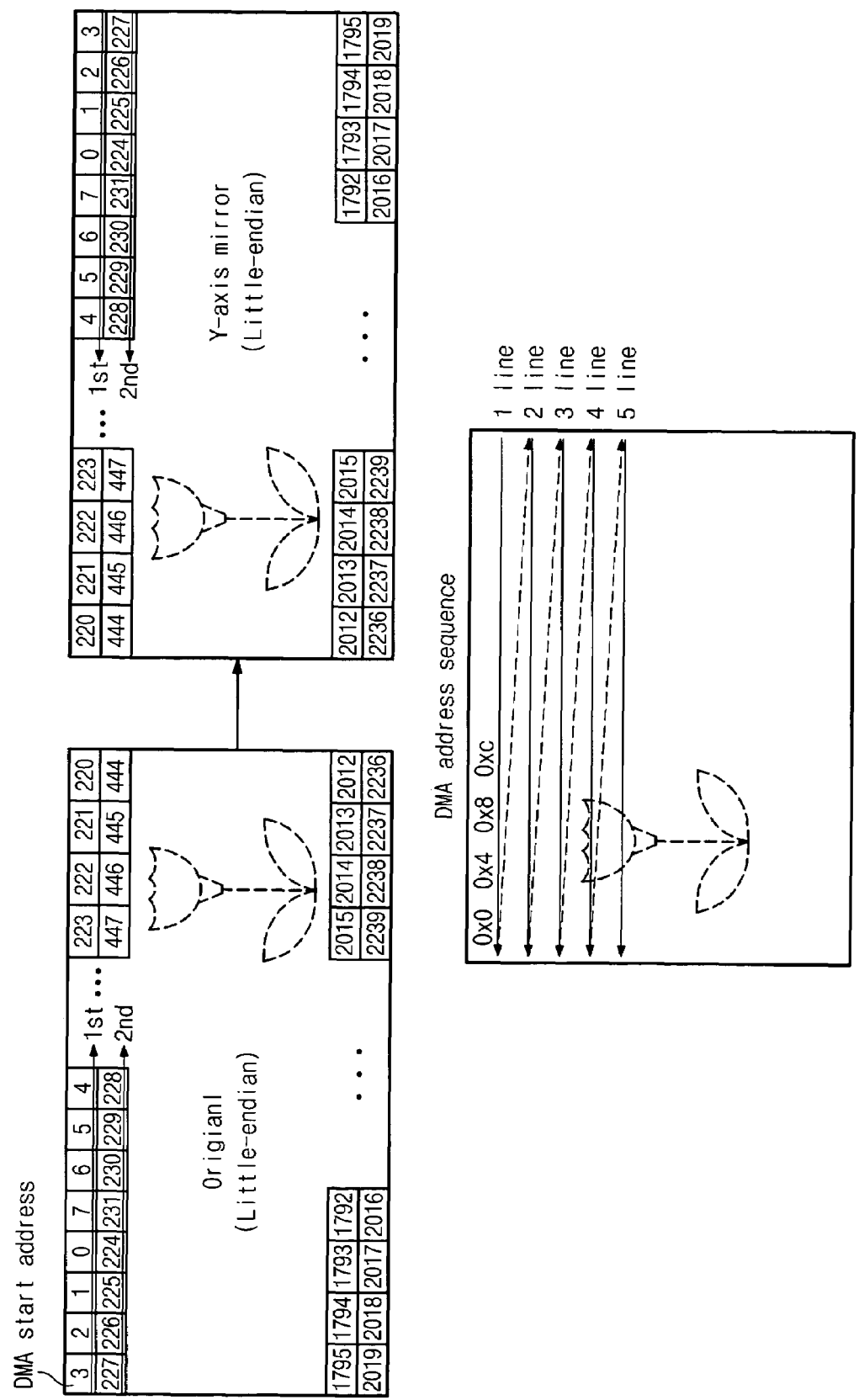
FIG. 10 illustrates an address modification during an image transform (Y-axis mirroring, flipping) to correct for an Y-axis mirrored image.
Figure 11:
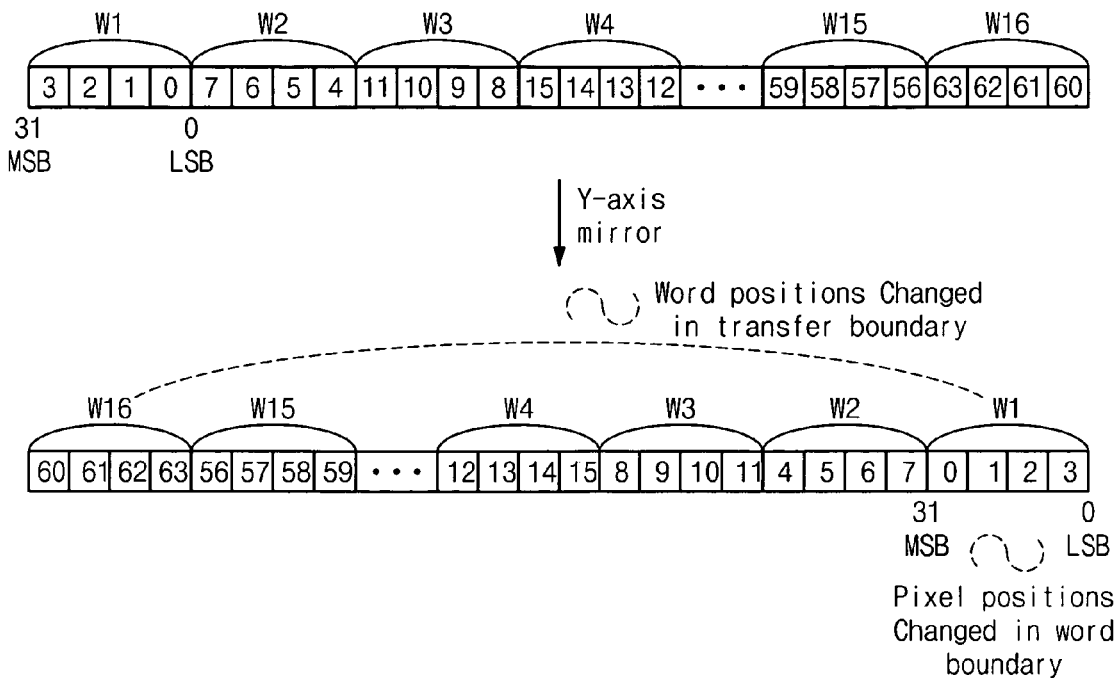
FIG. 11 illustrates the features of modifying the sequences of words and of pixels in each word within a burst transfer length 16 for Y-axis mirroring.

FIG. 10 illustrates an address modification during an image transform (mirroring on Y-axis) to correct for a Y-axis mirror image. As shown in FIG. 10, DMA addresses are needed to write data from the end of a (top) horizontal line towards the front. Further, it is necessary to reverse the sequences of words and pixels in a word from an original image within a burst transfer length. FIG. 11 illustrates a methodology for modifying the sequences of 16 words and pixels in a word within the burst transfer length 16 for Y-axis mirroring. A word sequence W1→W16 must be reversed to W16→W1, a pixel sequence in a word as well (e.g., a pixel sequence 0, 1, 2, 3 in the first word W1 should be reversed into 3, 2, 1, 0).

Figure 12:
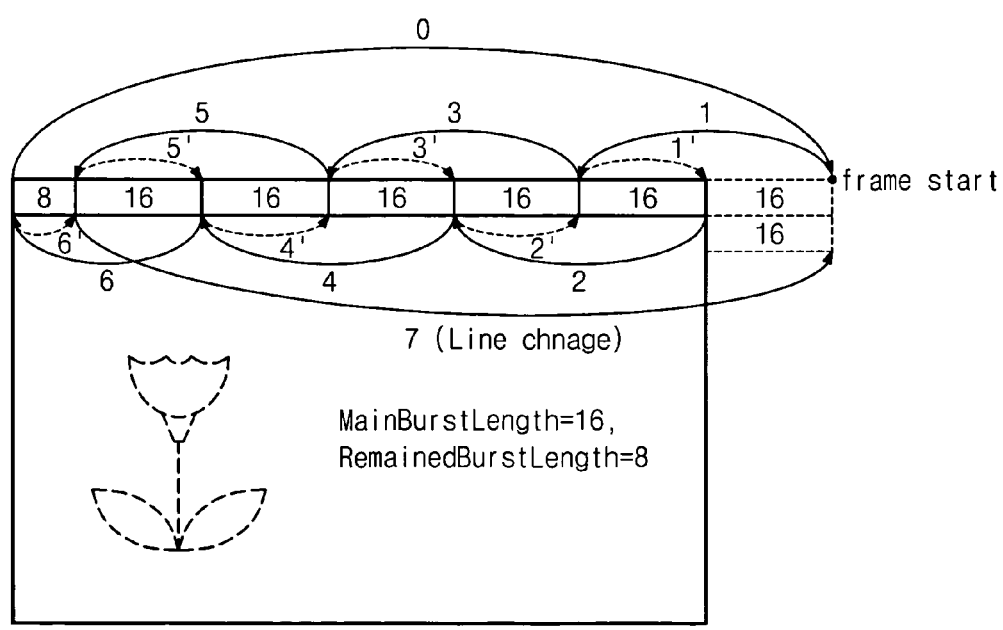
FIG. 12 illustrates an address modifying feature affecting the sequences of words and of pixels in each word and the arrangement of DMA addresses for Y-axis mirroring.

FIG. 12 illustrates the effect of the address modifying process on the sequences of words and pixels in a word and a DMA address order in Y-axis mirroring. In FIG. 12, the broken lines denote changes of addresses incrementing in sequence due to the burst transfer operation, while the solid lines denote changes of burst transfer start addresses during a data transfer within the unit of burst length. A frame start address 288 (=224+64) is established by adding an address space 64, corresponding to the burst length 16 (i.e., assigned to 64 pixels corresponding to the burst length 16), to an address space 224 corresponding to one (the top) horizontal line (i.e., an address space corresponding to 224 pixels of one horizontal line). A second burst transfer start address is established by subtracting an address space (for 64×2 pixels), corresponding to the sum of the prior burst-16 transfer and a current (second) burst-16 transfer (i.e., a double main burst transfer), from a current address, preliminarily allowing for an address to be increased from the current address due to the main burst transfer before the burst transfer. At this time, if there is a remaining burst transfer, the last burst transfer start address is established by subtracting an address space, corresponding to a sum of the main and remaining burst transfers, from a current address, not subtracting an address space corresponding to the two-times main burst transfer from the current address at the time of terminating the burst transfer.

Referring to FIG. 10, the first burst transfer start address 160 is established by subtracting the address space 128, which corresponds to 128 pixels of a double burst length, from the frame start address 288. Data of 64 pixels are stored in the external frame memory 127 from the address 160 to the address 223 in the burst transfer length 16. The second burst transfer start address is established as 96 by subtracting the address space 128, corresponding to 128 pixels (of the previous burst transfer length 16 and the current burst transfer length 16) from the current address 224 at the time of terminating the first transfer. 64 pixels transferred by the second burst transfer are stored in the external frame memory 127 from the address 96 to the address 159. Such a procedure is repeated until completing the data transfer operation for one horizontal line.

After the third burst transfer, a further 64 pixels are stored in the external frame memory 127 from the address 32 to the address 95. At the time of completing the third burst transfer, the current address is 96 and the number of remaining pixels is 32 (smaller than 64 pixels of the burst transfer length 16). Thus, the last burst transfer start address is established at 0 by subtracting an address space assigned to a sum of 64 pixels, corresponding to the previous burst transfer length (i.e., the main burst transfer length), and 32 pixels, corresponding to the remaining burst transfer length for the remaining pixels, from the current address 96. The remaining pixels (32 in number) are transferred in the remaining burst length 8 and then stored in the external frame memory 127 from the addresses 0 to 31. If the number of the horizontal pixels is divided by the burst transfer length, the last burst transfer start address is set by subtracting an address space, assigned to pixels corresponding to a double burst transfer length, from the current address at the time of terminating the previous burst transfer.

In the case of processing an image frame where there is a remainder when dividing the number of the horizontal pixels transferred in the burst transfer length 16, the burst transfer operation is composed of the main burst transfer modes and the remaining burst transfer mode for the last burst transfer. Therefore, the last burst transfer start address of one horizontal line is established by subtracting an address space, corresponding to a sum of pixels for the main and remaining burst transfer lengths, from a current address at the time of terminating a previous burst transfer. Otherwise, the last burst transfer start address of one horizontal line is established by subtracting an address space, corresponding to pixels of a double main burst transfer length, from a current address, and then adding an address space, corresponding to a difference between pixels of the main and remaining burst transfer lengths, thereto.

Similarly, the second line start address is established as 512 by adding the address space 448, (corresponding to the address space of two horizontal lines), from the current address 32 (an address space corresponding to the number of pixels of the remaining burst length) at the time of termination of the transfer process for one horizontal line, and then adding the address space 32, (space assigned to pixels corresponding to a difference between the last two burst transfer lengths, i.e., a difference between the main burst length 16 and the remaining burst length 8), thereto. If the number of horizontal pixels is divisible by the burst transfer length, (which means the last two burst transfer lengths are the same), the line start address may be set by adding an address space, (corresponding to the space of two horizontal lines), to a current address at the time of terminating a process for one horizontal line. Such a procedure is repeated until the transfer process for one image frame is completed.

XY-Axes Mirroring Process for XY-Axes Mirror Mode

Figure 13:
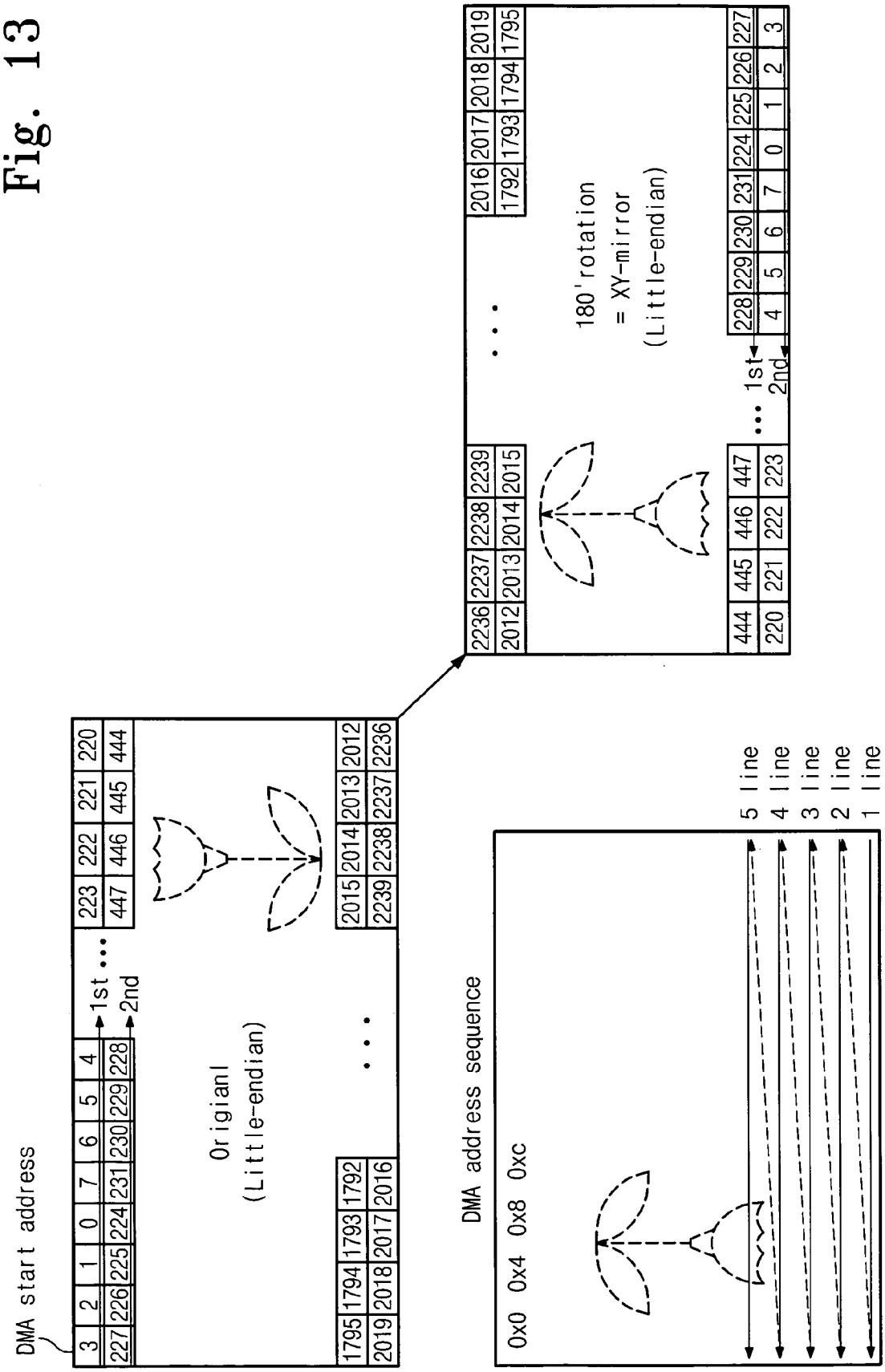
FIG. 13 illustrates an address modification during an image rotation (mirroring on XY-axes) to correct for an XY-axes mirrored image.

FIG. 13 illustrates an address modification during an image transform (mirroring on X/Y-axes) to correct for a X/Y-axes mirror image. As shown in FIG. 13, mirroring an image on XY-axes requires a sequence of DMA addresses for writing data from the end to the front of each horizontal line, and from the last (bottom) line up to the top line in an image frame. Further, it needs to reverse the sequences of words and pixels in a word in the unit of the burst transfer length.

Figure 14:
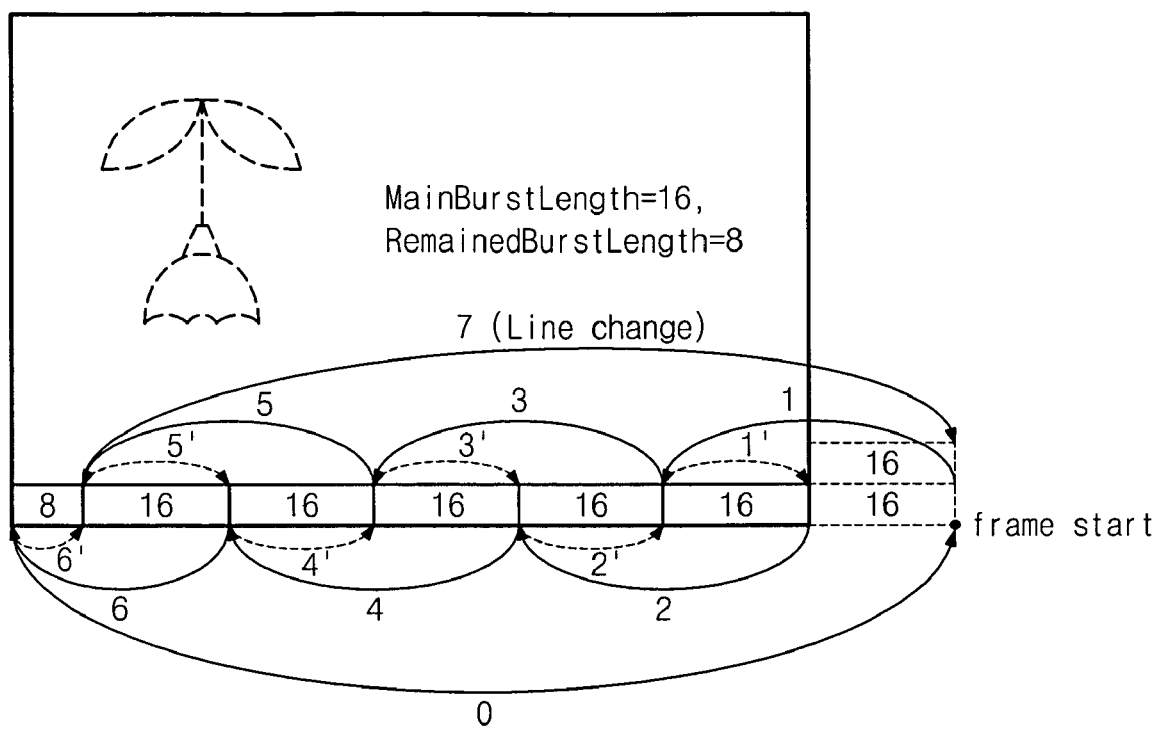
FIG. 14 illustrates an address modifying feature affecting the sequences of words and of pixels in each word and the arrangement of DMA addresses in XY-axes mirroring (image rotation)

FIG. 14 illustrates an address modifying procedure for establishing the sequences of words and of pixels in a word, and the DMA address arrangement for XY-axes mirroring of an image. In FIG. 14, the broken lines denote address modifications incrementing in sequence due to burst transfers, while the solid lines denote modifications of burst transfer start addresses during transfers in the unit of burst length. This XY-axes mirroring process establishes a burst transfer start address similar to the Y-axis mirroring process in that a frame start address begins from the last (bottom) line of a frame and a line start address changes in the upward direction upon every completion of a transfer process for each line.

Referring to FIGS. 13 and 14, a frame start address is established as 2304 by adding the address space 64, (corresponding to 64 pixels with the burst length 16), to the whole address space 2240 of one image frame. Burst transfer start addresses are set by the same manner as in the Y-axis mirroring process. Thus, the first burst transfer is set to 2176 by subtracting the address space 128, (corresponding to a double main burst transfer length), from the frame start address 2304. Then, 64 pixels (in the unit of the burst length 16) are stored in the external frame memory 127 from the address 2176 to the address 2239. As described above in relation to the Y-axis mirroring mode, if the number of the last remaining pixels is smaller then the burst length 16 (i.e., if there is a remaining burst transfer), the last burst transfer start address is established by subtracting an address space, (corresponding to a sum of pixels of the main and remaining burst transfer lengths), from a current address at the time of completing the previous burst transfer.

A line start address is established by adding an address space, (corresponding to a difference between the main burst transfer length 16 and the remaining burst transfer length 8, i.e., a difference between the last two burst transfer lengths), from a current address at the time of completing a process for one horizontal line. If the number of horizontal pixels is divisible by the burst transfer length, the difference between the last two burst transfer lengths will be 0.

Figure 15B:
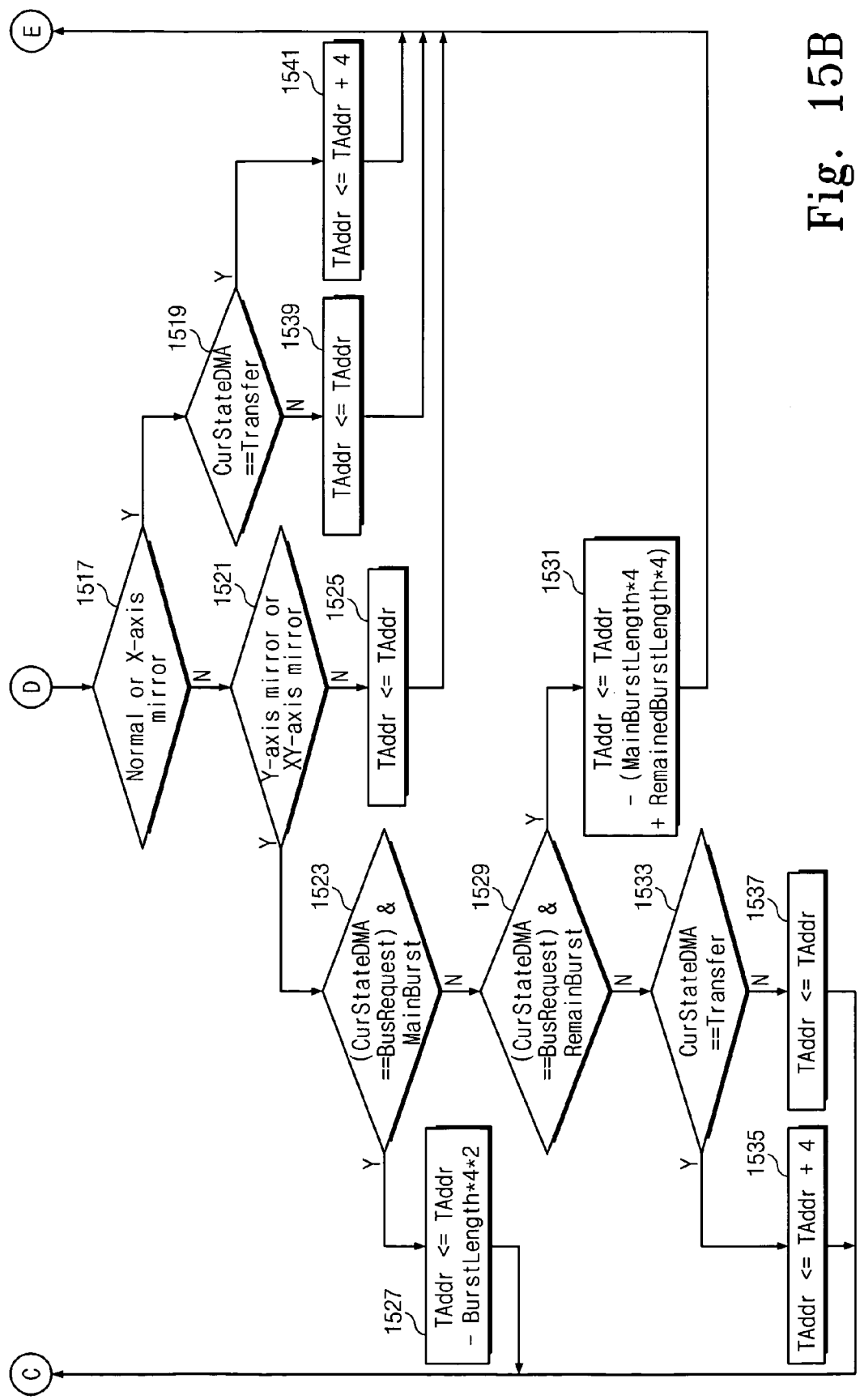
FIG. 15 is a flow chart describing a method of operation of the address generator.

FIG. 15 (15A+15B) is a flow chart illustrating the method of operation of the address generator 211*a* (or 211*b*). Starting at the idle state IDLE, next the decision step 1501 determines whether there is an enabled frame start signal. If the frame start signal is enabled, a frame start signal is established in accordance with the X-axis mirror image mode, the Y-axis mirror image mode, the XY-axes mirror image mode, or the normal mode, and afterwards the state returns to the idle state IDLE.

In the step 1501, unless the frame start signal is enabled (i.e., data is being transferred), step 1505 is performed to determine that a current process reached the end of line in the X-axis mirror mode. If the step 1505 results in a positive determination Y (i.e., if a current process is terminated for one horizontal line in the X-axis mirror mode), step 1507 is performed wherein a new line start address is established by subtracting an address space, (corresponding to two horizontal lines), from a current address at the time of termination (TAdd<=TAdd−LineWidth×2), and then it returns to the idle state IDLE. If the decision step 1505 results in a negative determination N (i.e., not the end of line or not the X-axis mirror mode), step 1509 is performed wherein to determine whether a current process is on the end of line in the Y-axis mirror mode. If step 1509 results in a positive determination Y (i.e., if a current process is terminated for one horizontal line in the Y-axis mirror mode), step 1511 is performed wherein a new line start address is established by adding an address space, (corresponding to pixels of the double burst transfer length), to a current address at the time of termination, and adding an address space, (corresponding to a difference between pixels of the main and remaining burst transfer lengths), thereto (TAdd<=TAdd+LineWidth×2+MainBurstLength×4−RemainedBurstLength×4), and then it returns to the idle state IDLE.

If the decision step 1509 results in a negative determination N (i.e., not the end of line nor the Y-axis mirror mode), step 1513 is performed wherein it is determined whether a current process is on the end of line in the XY-axes mirror mode. If the decision step 1513 results in a positive determination Y (i.e., if a current process is terminated for one horizontal line in the XY-axes mirror mode), step 1515 is performed wherein a new line start address is established by adding an address space, (corresponding to a difference between pixels of the main and remaining burst transfer lengths), to a current address at time of terminating a process for one horizontal line (TAdd<=TAdd+MainBurstLength×4−RemainedBurstLength×4), and then it returns to the idle state IDLE.

If the decision step 1513 results in a negative determination N (i.e., not the end of line nor the XY-axes image mode), decision step 1517 is performed wherein it is determined whether a current process is the normal mode of the X-axis mirror mode. If the decision step 1517 results in a positive determination Y (i.e., if a current process is the normal mode or the X-axis mirror mode), decision step 1519 is performed wherein it is determined whether the DMA-finite state machine is in a Transfer state. If the decision step 1519 results in a positive determination Y, (which means a data transfer is carried out in the unit of word), an address is incremented by one word in step 1541 (TAdd<=TAdd+4) and then it returns to the idle state IDLE. If the decision step 1519 results in negative determination N, (which means there is no data transfer), step 1539 is performed so that it returns to the idle state IDLE without changing an address (TAdd<=TAdd).

If the decision step 1517 results in a negative determination (i.e., not the normal mode nor the XY-axes image mode), decision step 1521 is performed wherein it is determined whether a current process is either one of the Y-axis mirror mode or the XY-axes mirror mode. If the decision step 1521 results in a positive determination Y (i.e., if a current process is the Y-axis mirror mode or the XY-axes mirror mode), step 1523 is performed wherein it is determined whether the DMA-finite state machine is in the Main Burst transfer mode. If the decision step 1523 results in a positive determination Y, a burst transfer start address is established by subtracting an address space, (corresponding to pixels of a double burst transfer length), from a current address (TAdd<=TAdd−2×BurstLength×4) and then it returns to the idle state IDLE.

If the decision step 1523 results in a negative determination N (i.e., not in the main burst transfer mode), step 1529 is performed wherein it is determined whether the DMA-finite state machine is in the Remaining Burst transfer mode. If the decision step 1529 results in a positive determination Y (i.e., the last burst transfer for one horizontal line in the Y-axis mirror mode or the XY-axes mirror mode), a burst transfer start address of on horizontal line is established by subtracting an address space, (corresponding to pixels of the main and remaining burst transfer lengths), from a current address (TAdd<=TAdd−MainBurstLength×4−RemainedBurstLength×4) and then it returns to the idle state IDLE.

If the decision step 1529 results in a negative determination N, step 1533 is performed wherein it is determined whether the DMA-finite state machine is in a Transfer state. If the decision step 1533 results in a positive determination Y, (which means a data transfer is carried out in the unit of word), an address is incremented by one word in step 1535 (TAdd<=TAdd+4) and then it returns to the idle state IDLE. If the decision step 1533 results in a negative determination N, (which means there is no data transfer), it returns to the idle state IDLE without changing an address (TAdd<=TAdd).

Figure 16:
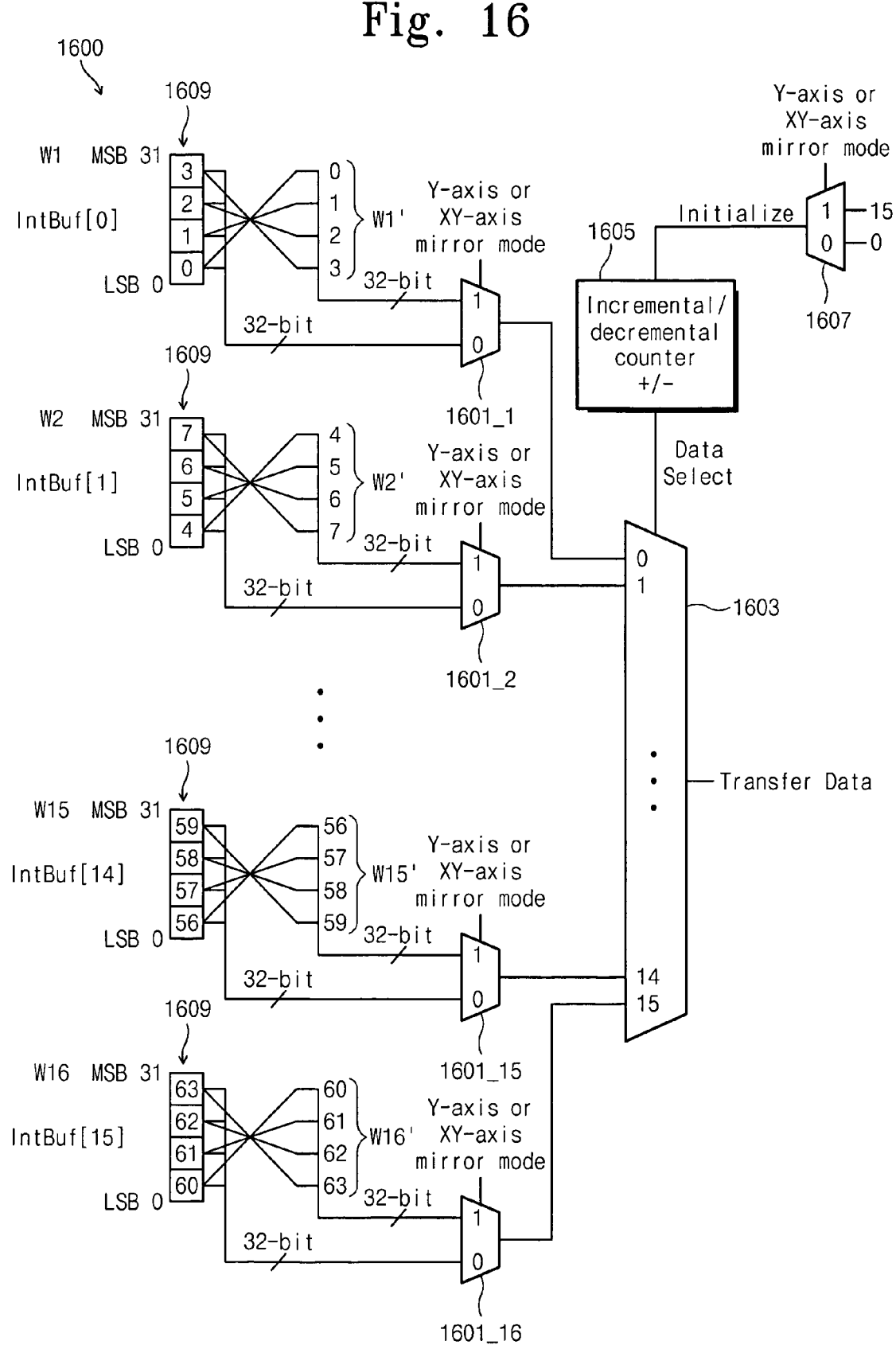
FIG. 16 is a detailed diagram of the data selector.

FIG. 16 is a detailed block diagram of the data selector 1600 (e.g., corresponding to 213*a* or 213*b* shown in FIG. 2). The data selector 1600 modifies the sequences of words and pixels in a word, of pixel data supplied from the internal buffer memory 1609 (e.g., corresponding to 207*a* or 207*b* shown in FIG. 2), in compliance with a selected mirror image mode. The internal buffer memory 1609 is designed to be capable of storing image data in correspondence with the burst transfer. The internal buffer memory 1600 may be constructed, for example, of thirty-two (32) flipflops the number thirty-two corresponding to twice the burst transfer length 16. The data selector 1600 includes a plurality of multiplexers that include sixteen pixel-sequence modifying multiplexers 1601_1 through 1601_16 corresponding to the burst transfer length 16, and a word-sequence modifying multiplexer 1603. Each of the pixel-sequence modifying multiplexers 1601_1 through 1601_16 multiplexes a word correspondingly stored in the internal buffer memory 1609 and a derived word having a reverse pixel sequence therein. In other words, each pixel-sequence modifying multiplexer outputs a word with a corresponding four pixel data stored in the reversed pixel sequence. For instance, if the multiplexer 1601_1 outputs a word W1 (having four pixels in the sequence of 3, 2, 1, and 0), and a word W1' (having four pixels in the reverse sequence of 0, 1, 2, and 3). The word-sequence modifying multiplexer 1603 multiplexes the sixteen outputs provided from the sixteen pixel-sequence modifying multiplexers 1601.

In the XY-axes mirror mode or the Y-axis mirror mode (i.e., when a mode selection signal Flip_mode is logically high), the reversed sequence of 4 pixels constituting a sequence modified word (e.g., W1') is output from each pixel-sequence modifying multiplexer. On the other hand, in the X-axis mirror mode or the normal mode (i.e., when a mode selection signal Flip_mode is logically low), each word constituting pixels stored in the internal buffer memory 1609 is output from the each pixel-sequence modifying multiplexer without change of the pixel sequence thereof.

The word-sequence modifying multiplexer 1603 varies the output sequences of words supplied from the 16 pixel-sequence modifying multiplexers 1601_1 through 1601_16. In detail, the word-sequence modifying multiplexer 1603 outputs pixel data arranged in the same sequence as pixel data stored in the internal buffer memory 1609 or in the reverse sequence, in response to an output of the data selection signal Data_select of counter 1605. The counter 1605 carries out a counting operation in the range from 0 to L−1 (here, L means the burst transfer length, e.g., 16). The initial value of the counter 1605 is set by a counter-initializing multiplexer 1607. The counter-initializing multiplexer 1607 has input values ranged from 0 to L−1 (e.g., 15), an output of which is selected by the mode selection signal. When the mode selection signal Flip_mode is logically high, (i.e., in the XY-axes mirror mode or the Y-axis mirror mode), the counter-initializing multiplexer 1607 outputs L−1 (e.g., 15) to establish the initial value of the counter 1605 at L−1 (15). Thereafter, the counter 1605 performs a decrementing counting operation by decrementing from L−1 to 0 (e.g., from 15 to 0, in the burst transfer length 16), which provides the data selection signal Data Select for the word-sequence modifying multiplexer 1603. For example, when the counter 1605 outputs 15, the word-sequence modifying multiplexer 1603 selects and outputs W16 among the 16 words W1 through W16. When the counter 1605 outputs 14, the word-sequence modifying multiplexer 1603 selects and outputs W15 among the 16 words W1 through W16 . . . . When the counter 1605 outputs 1, the word-sequence modifying multiplexer 1603 selects and outputs W2 among the 16 words W1 through W16. When the counter 1605 outputs 0, the word-sequence modifying multiplexer 1603 selects and outputs W1 among the 16 words W1 through W16. As a result, the sequence of the output words is arranged in W16, W15, W14, W13, . . . , W2, and W1, in order, which is the reverse from the sequence (W1, W2, W3, . . . , W15, and W16, in order) stored in the internal buffer memory 1609. On the other side, in the normal mode, or in the X-axis mirror mode, the mode selection signal Flip_mode into multiplexer 1607 goes to logic low to set the initial value of the counter 1605 at 0. Thus, the counter increments its counting values, from 0 to 15, and provides the count values to the word-sequence modifying multiplexer 1603. As a result, the word-sequence modifying multiplexer 1603 outputs words in the sequence of W1, W2, W3, . . . , W15, and W16, which is the same order as stored in the internal buffer memory 1609.

Consequently, when the mode selection signal Flip_mode is logically high (in the XY-axes mirror mode or the Y-axis mirror mode), the sequence of pixels in a word are reversed, as well as the sequence of words.

Figure 17:
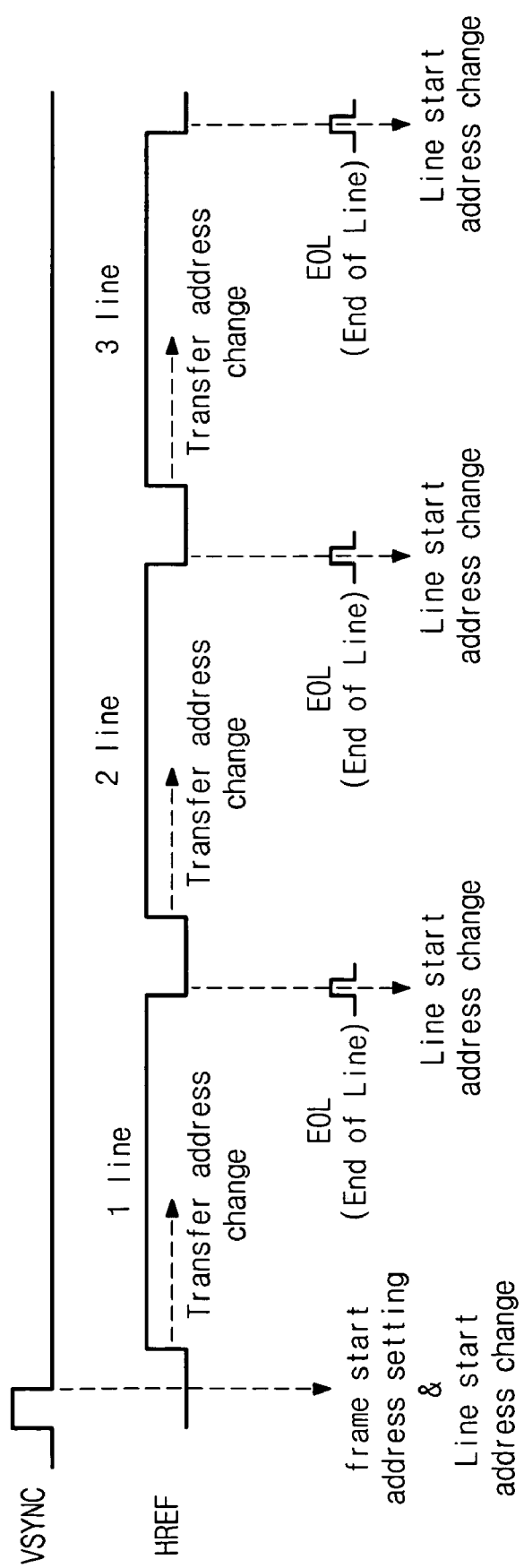
FIG. 17 illustrates timings of DMA address modification and the order thereof.

FIG. 17 illustrates timings of DMA address modification and the sequential order thereof. Referring to FIG. 17, responding to a falling edge of a frame start signal VSYNC, frame and line start addresses are set by the address generator 211a (or 211b). All commands set by the specific-functional register are enabled with validity at the falling edges of the frame start signal VSYNC. After establishing the frame and line start addresses, a line transfer start signal HREF is enabled (e.g., logic High). After the line transfer start signal HREF is active (e.g., logic High), a burst transfer start address is generated by the above described method before a burst transfer. By counting the number of burst transfers performed, a line end signal EOL informing the end of one horizontal line is generated and the line transfer start signal HREF becomes inactive (e.g., logic Low).

Figure 18:
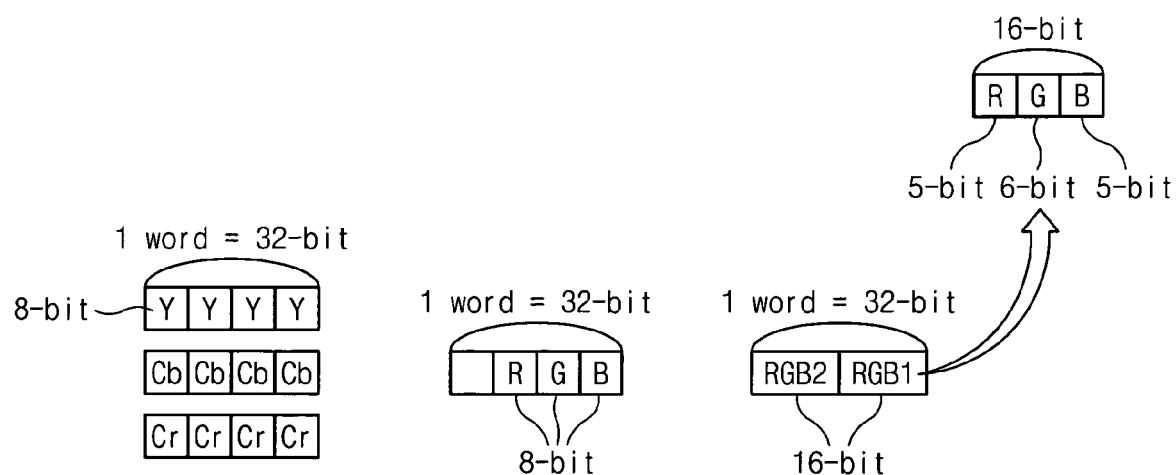
FIG. 18 illustrates pixel data types processed in the camera module.

While the aforementioned description is related to a codec DMA unit (i.e., 119a of FIG. 2), the preview DMA unit (i.e., 119b of FIG. 2) can also be implemented with the same structure and manner of operation as described above. But, while the codec DMA unit is configured such that a word is composed of 4 pixels (because one pixel is one byte), the preview DMA unit is configured with an RGB format of 16 bits or 24 bits. FIG. 18 illustrates such RGB data types to be processed in the camera module. In this case, different from the codec DMA unit, when the RGB format is constructed of 16 bits, a word is composed of two sixteen-bit pixels (each pixel is constituted of 5-bit R, 6-bit G, and 5-bit B). When the RGB format is constructed of 24 bits, a word is composed of one pixel (R, G, and B, each of 8 bits). When the RGB format is constructed of 24 bits, there is no variation in the sequence of pixels in a word in the XY-axes mirror mode or the Y-axis mirror mode.

Although the present invention has been described in connection with the embodiment of the present invention illustrated in the accompanying drawings, it is not limited thereto. It will be apparent to those skilled in the art that various substitutions, modifications and changes may be made thereto without departing from the scope and spirit of the invention.

According to the present invention stated above, it is possible to reduce the size of a digital camera module by performing image mirror functions with a DMA unit, implementing a high-speed and low-power image transforming system.

The present invention may, however, be embodied in different forms and should not be construed as limited to the exemplary embodiments set forth herein. While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A circuit comprising:
   a direct memory access (DMA) controller including:
      a buffer memory for storing image data to be transferred onto a system bus by a (DMA) burst transfer having a first burst transfer length;
      a data selector configured to selectively modifying sequence of transferred words and the sequence of pixels in each word, of the image data during the DMA burst transfer;
      an address generator configured to output a frame start address and a line start address of the modified image data to effect image mirroring.

2. The circuit of claim 1, further comprising:
   a DMA control circuit configured to manage the burst DMA transfer from the buffer memory and through the data selector.

3. The circuit of claim 1, wherein in an X-axis mirror image mode:
   the data selector maintains the original sequence of words and the original sequence of pixels in each word, of the image data stored in the buffer memory; and
   the address generator establishes the frame start address by subtracting an address space corresponding to one horizontal line of the frame, from the whole address space of the frame of the image data; and
   the address generator establishes a second line start address by subtracting the address space corresponding to two horizontal lines, from a current address after terminating a transfer process for a first horizontal line.

4. The circuit of claim 1, wherein in a Y-axis mirror mode:
   the data selector reverses the original sequences of words and the original sequence of pixels in each word, of the image data stored in the buffer memory; and
   the address generator establishes the frame start address by adding an address space corresponding to the burst transfer length, to an address space corresponding to one horizontal line of the image data, and establishes a burst transfer start address by subtracting an address space corresponding to the sum of the burst transfer length and a current burst transfer length, from a current address before a burst transfer; and the address generator establishes a second line start address by adding address spaces corresponding to two horizontal lines and a difference between the last two transfer burst lengths of a horizontal line, to a current address after terminating a transfer process for a first horizontal line.

5. The circuit of claim 1, further comprising:
a microprocessor on the system bus;
a display controller on the system bus; and
a frame buffer on the system bus operatively coupled to the display controller, wherein the frame buffer is configured to receive the modified image data transferred by the burst DMA transfer over the system bus, and the display controller is configured to output the modified image data in the frame buffer to a display device.

6. The circuit of claim 1, wherein in an XY-axes mirror image mode:
the data selector reverses the original sequence of words and the original sequence of pixels in each word, of the image data stored in the buffer memory; and
the address generator establishes the frame start address by adding an address space corresponding to the burst transfer length, to the whole address space of a frame of the image data, establishes a burst transfer start address by subtracting an address space corresponding to the sum of the burst transfer length and a current burst transfer length, from a current address before a burst transfer.

7. The circuit of claim 6, wherein the address generator establishes a second line start address by adding address spaces corresponding to a difference between the last two burst transfer lengths of a horizontal line, to a current address after terminating a transfer process for a first horizontal line.

8. The circuit of claim 1, wherein the buffer memory includes first, second and third buffers configured to respectively store the image data as first, second and third color components defined in a first color space.

9. The circuit of claim 1, wherein the data selector comprises:
pixel-sequence modifying multiplexers each for selecting between a first word having the original pixel sequence stored in the buffer memory and a second word having the reverse pixel sequence; and
a word-sequence modifying multiplexer for receiving the selected words from the pixel-sequence modifying multiplexers and outputting the selected words in a selected one of the original sequence of words or the reverse sequence of words.

10. The circuit of claim 9, wherein each of the pixel-sequence modifying multiplexers outputs a selected word among the word having the original pixel sequence and a word having the reverse pixel sequence according to a mode selection signal; and
each of the word-sequence modifying multiplexer outputs a selected word in response to count output by a counter having a count ranging between 0 and the burst transfer length minus one.

11. A direct memory access (DMA) controller for a microprocessor system having a system bus, the DMA controller comprising:

a buffer memory for storing image data to he transferred onto the system bus by a burst DMA transfer having a burst transfer length;
a data selector configured to selectively modify the sequence of transferred words and the sequence of pixels in each transferred word, of the image data stored in the buffer memory, during the burst DMA transfer and based upon a state of a DMA control circuit;
the DMA control circuit configured to manage the burst DMA transfer from the buffer memory and through the data selector; and
an address generator for outputting a frame start address and a line start address for image data stored in the buffer memory and received from the data selector, based upon the state of the DMA control circuit to effect image mirroring.

12. The DMA controller of claim 11, further comprising:
a bus protocol signal generator for outputting a bus signal based upon the state of the DMA control circuit.

13. The DMA controller as set forth in claim 11, wherein the DMA control circuit comprises;
a DMA-finite state machine for indicating a DMA transfer state;
a channel arbiter for managing DMA access priorities for color components; and
a finite state machine for controlling a data fetch from a FIFO memory to the buffer memory based upon the states of the DMA-finite state machine and of the channel arbiter.

14. The DMA controller of claim 11, wherein the data selector comprises:
a plurality of pixel-sequence modifying multiplexers each pixel-sequence modifying multiplexer for selecting one of a word having an original pixel sequence stored in the buffer memory and a word having the reverse pixel sequence; and
a word-sequence modifying multiplexer for receiving the words selected by the plurality of pixel-sequence modifying multiplexers and to output the selected words in a selected one of original sequence of words and the reverse sequence of words.

15. The DMA controller of claim 14, wherein each of the pixel-sequence modifying multiplexers selects the sequence of pixels of each of the words based upon a mode selection signal; and
the word-sequence modifying multiplexer selects the original sequence of the words transferred in each burst transfer or the reverse sequence of the words in response to the count output by a counter.

16. The DMA unit of claim 14, wherein in either one of a Y-axis minor image mode and an XY-axes minor image mode, the data selector reverses the sequences of the words and reverses the sequence of pixels in each word, of the image data stored in the buffer memory; and
wherein in either one of an X-axis minor image mode and a normal mode, the data selector maintains the original sequences of the words and the original sequence of the pixels in each word, of the image data stored in the buffer memory.

17. The DMA controller as set forth in claim 12, wherein in a Y-axis minor mode, the address generator:
establishes the frame start address by adding an address space corresponding to the burst transfer length, to an address space corresponding to one horizontal line of the image data;
establishes a burst transfer start address by subtracting an address space corresponding to the sum of the burst transfer length and a current burst transfer length, from a current address before a burst transfer; and establishes the line start address by adding address spaces corresponding to two horizontal lines and the difference between the last two transfer burst lengths of a horizontal line, to a current address after terminating a process for a first horizontal line.

18. The DMA controller as set forth in claim 12, wherein in an XY-axes mirror image mode, the address generator:
establishes the frame start address by adding an address space corresponding to the burst transfer length, to the whole address space of a frame of the image data;
establishes a burst transfer start address by subtracting an address space corresponding to a sum of the burst transfer length and a current burst transfer length, from a current address before a burst transfer; and
establishes the line start address by adding address spaces corresponding to a difference between the last two burst transfer lengths of a horizontal line, to a current address after terminating a transfer process for a first horizontal line.

19. The DMA unit as set forth in claim 12, wherein in an X-axis minor image mode, the address generator:
establishes the frame start address by subtracting an address space corresponding to a horizontal line, from the whole address space of a frame of the image data; and
establishes a new line start address by subtracting an address, corresponding to two horizontal lines, from a current address after terminating a transfer process for a first horizontal line.

20. A camera interface for transferring image data to a frame memory from a camera module through a system bus, the camera interface comprising:
a pre-processor for managing a pre-processing operation with the image data received from the camera module;
a color sealer for storing image data from the pre-processor in a FIFO memory and for modifying the number of pixels of the image data; and
a DMA controller configured to burst transfer the image data stored in the FIFO memory onto the system bus, and adapted to perform an image transform upon the image data during the DMA burst transfer, wherein the DMA controller comprises:
a buffer memory configured to store the image data provided from the FIFO memory during a DMA burst transfer;
a DMA control circuit configured to manage the DMA burst transfer from the buffer memory;
a data selector configured to selectively modify the sequence of words and the sequence of pixels in each word of the image data, during the DMA burst transfer and based upon the state of the DMA control circuit; and
an address generator for outputting a frame start address and a line start address for image data supplied from the data selector, based upon the state of the DMA control circuit to effect image mirroring.

21. The camera interface of claim 20, wherein the DMA controller further comprises:
a bus protocol signal generator for outputting a bus signal based upon the state of the DMA control circuit.

22. The camera interface of claim 21, wherein the data selector comprises:
a plurality of pixel-sequence modifying multiplexers each for selecting between a word having the original pixel sequence stored in the buffer memory and a word having the reverse pixel sequence; and
a word-sequence modifying multiplexer for receiving the words from the pixel-sequence modifying multiplexers and for outputting the words in the original sequence of words or in the reverse sequence of words;
wherein each of the pixel-sequence modifying multiplexers outputs a selected one of a word having the original pixel sequence and a word having the reverse pixel sequence based upon a mode selection signal; and
the word-sequence modifying multiplexer selectively outputs the words in the original sequence of words or in the reverse sequence of words in response to a count output of a counter.

23. The camera interface of claim 20, wherein the DMA control circuit comprises;
a DMA-finite state machine for indicating a DMA transfer state; and
a finite state machine controlling a data fetch from a FIFO memory to the buffer memory based upon a state of the DMA-finite state machine.

24. The camera interface of claim 20, wherein the DMA control circuit comprises:
a DMA-finite state machine for indicating a DMA transfer state;
a channel arbiter for managing DMA access priorities for color components; and
a finite state machine for controlling a data fetch from a FIFO memory to the buffer memory based upon states of the DMA-finite state machine and the channel arbiter.

25. A camera interface for a processor system having a microprocessor and a system bus, the camera interface comprising:
a DMA controller configured to burst transfer image data stored in a buffer memory onto the system bus and adapted to perform an image transform upon the image data during the DMA burst transfer, wherein the DMA controller comprises:
the buffer memory configured to store the image data to be transferred during the DMA burst transfer;
a data selector configured to selectively modify, during the DMA burst transfer, the sequence of words and the sequence of pixels in each word of the image data stored in the buffer memory; and
an address generator configured to output a frame start address, a line start address, a burst transfer start address for image data supplied form the data selector to effect image mirroring.

26. The camera interface of claim 25, further comprising:
a DMA control circuit configured to manage the DMA burst transfer of the image data from the buffer memory, though the data selector, to the system bus.

* * * * *